United States Patent
Byeon et al.

(10) Patent No.: US 12,537,975 B2
(45) Date of Patent: Jan. 27, 2026

(54) METHOD AND APPARATUS FOR VIDEO CODING USING SUBBLOCK CODING ORDER CHANGE AND INTRA PREDICTION ACCORDING TO SAME

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Joo Hyung Byeon, Seoul (KR); Dong Gyu Sim, Seoul (KR); Min Hun Lee, Uijeongbu-si (KR); Seung Wook Park, Yongin-si (KR); Jin Heo, Yongin-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 36 days.

(21) Appl. No.: 18/586,024

(22) Filed: Feb. 23, 2024

(65) Prior Publication Data
US 2024/0196009 A1    Jun. 13, 2024

Related U.S. Application Data

(63) Continuation of application No. PCT/KR2022/012238, filed on Aug. 17, 2022.

(30) Foreign Application Priority Data

Sep. 8, 2021 (KR) .......... 10-2021-0119525
Aug. 16, 2022 (KR) .......... 10-2022-0101869

(51) Int. Cl.
H04N 19/96    (2014.01)
H04N 19/11    (2014.01)
(Continued)

(52) U.S. Cl.
CPC .......... H04N 19/593 (2014.11); H04N 19/11 (2014.11); H04N 19/119 (2014.11); H04N 19/136 (2014.11); H04N 19/176 (2014.11)

(58) Field of Classification Search
CPC ....... H04N 19/119; H04N 19/96; H04N 19/11
See application file for complete search history.

(56) References Cited

U.S. PATENT DOCUMENTS 10,142,654 B2 *   11/2018   Peng ............... H04N 19/105
10,218,975 B2 *    2/2019   Chien .............. H04N 19/176
(Continued)

FOREIGN PATENT DOCUMENTS

KR    20170102806 A    9/2017
KR    20180041579 A    4/2018
(Continued)

OTHER PUBLICATIONS

Extended Quad-Tree Partitioning for Future Video Coding; Wang; et al.—2019; (Year: 2019).*

(Continued)

Primary Examiner — Luis Perez-Fuentes
(74) Attorney, Agent, or Firm — Lempia Summerfield Katz LLC

(57) ABSTRACT

A method and an apparatus are disclosed for video coding using subblock coding order change and resultant intra prediction. The video coding method and the apparatus efficiently provide reference samples and perform intra prediction on subblocks of a current block using the reference samples when a coding order of the subblocks is changed. The video coding method and the apparatus
(Continued)

improve video coding efficiency and video quality when performing intra prediction on the subblocks.

10 Claims, 44 Drawing Sheets

(51) Int. Cl.
*H04N 19/119* (2014.01)
*H04N 19/136* (2014.01)
*H04N 19/176* (2014.01)
*H04N 19/593* (2014.01)

(56) References Cited

U.S. PATENT DOCUMENTS

| | | |
|---|---|---|
| 10,771,781 B2 | 9/2020 | Lee et al. |
| 10,798,375 B2 | 10/2020 | Piao et al. |
| 10,798,382 B2 * | 10/2020 | Zhao .................... H04N 19/64 |
| 11,057,624 B2 | 7/2021 | Moon |
| 11,259,030 B2 * | 2/2022 | Ahn ..................... H04N 19/157 |
| 11,272,221 B2 * | 3/2022 | Nam .................... H04N 19/176 |
| 11,297,309 B2 | 4/2022 | Kim |
| 11,363,260 B2 | 6/2022 | Lee et al. |
| 11,405,605 B2 | 8/2022 | Piao et al. |
| 11,695,918 B2 | 7/2023 | Piao et al. |
| 11,895,297 B2 * | 2/2024 | Yang .................... H04N 19/85 |
| 12,088,822 B2 * | 9/2024 | Rosewarne ........... H04N 19/119 |
| 12,160,619 B2 * | 12/2024 | Nam .................... H04N 19/119 |
| 12,238,339 B2 * | 2/2025 | Koo .................... H04N 19/136 |
| 12,294,701 B2 * | 5/2025 | Xu ....................... H04N 19/176 |
| 2019/0037216 A1 | 1/2019 | Cho |
| 2019/0281285 A1 | 9/2019 | Piao et al. |
| 2019/0281290 A1 | 9/2019 | Lee et al. |
| 2019/0394465 A1 | 12/2019 | Moon |
| 2020/0359014 A1 | 11/2020 | Piao et al. |
| 2020/0359015 A1 | 11/2020 | Piao et al. |
| 2021/0006778 A1 | 1/2021 | Kim |
| 2021/0021816 A1 | 1/2021 | Lee et al. |
| 2021/0297666 A1 | 9/2021 | Moon |
| 2022/0182602 A1 | 6/2022 | Kim |
| 2023/0308638 A1 | 9/2023 | Piao |

FOREIGN PATENT DOCUMENTS

| | | |
|---|---|---|
| KR | 20190068517 A | 6/2019 |
| KR | 20190107581 A | 9/2019 |
| KR | 20210031783 A | 3/2021 |

OTHER PUBLICATIONS

Quadtree plus binary tree with shifting; Ma; et al—2018; (Year: 2018).*

International Search Report and Written Opinion cited in corresponding international patent application No. PCT/KR2022/012238; Nov. 24, 2022; 10 pp.

* cited by examiner

SB_order_flag=0

QT_order0

VH_hor_order0        VH_ver_order0

SB_order_flag=1

QT_order1 or

VH_hor_order1        VH_ver_order1

Non-directional, vertical, and horizontal modes

■ : pred(x,y)   ▨ : Reference samples used

METHOD AND APPARATUS FOR VIDEO CODING USING SUBBLOCK CODING ORDER CHANGE AND INTRA PREDICTION ACCORDING TO SAME

CROSS-REFERENCE TO RELATED APPLICATIONS

This application is a continuation of International Application No. PCT/KR2022/012238, filed on Aug. 17, 2022, which claims priority to and the benefit of Korean Patent Application No. 10-2021-0119525, filed on Sep. 8, 2021, and Korean Patent Application No. 10-2022-0101869, filed on Aug. 16, 2022, the entire disclosures of each of which are incorporated herein by reference.

TECHNICAL FIELD

The present disclosure relates to a video coding method and an apparatus using subblock coding order change and resultant intra prediction.

BACKGROUND

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

The Intra Sub-Partitions (ISP) technique is to perform intra prediction on the current block by further dividing the current block into subblocks for the intra-prediction processing. ISP performs the partitioning into subblocks by using a flag that determines whether to perform the partition in ISP mode and by using a flag that determines whether to perform the partition horizontally or vertically. At this time, the current block is partitioned into subblocks by implicitly determining 2 or 4 subblocks based on the size of the current block. Sequentially from top to bottom in the case of horizontal partitioning mode and from left to right in the case of vertical partitioning mode, the partitioned subblocks are reconstructed by using intra prediction, entropy reconstruction, inverse quantization, and inverse transform. On the second and subsequent subblocks, intra prediction may be performed using reconstruction samples of the previously reconstructed subblock.

Based on the intra-prediction mode, the order of reconstruction of the subblocks may be changed. Therefore, to improve the coding efficiency and improve video quality, there is a need to further improve the intra-prediction method of the subblocks according to the reconstruction order.

SUMMARY

The present disclosure seeks to provide a video coding method and an apparatus for improving video coding efficiency and video quality when performing intra prediction on subblocks of a current block. When a coding order of the subblocks is changed, the video coding method and the apparatus efficiently provide reference samples and perform intra prediction on the subblocks using the reference samples.

At least one aspect of the present disclosure provides a method performed by a video decoding apparatus for decoding subblocks partitioned from a current block. The method includes decoding, from a bitstream, an intra-prediction mode of the current block, a partitioning mode of the subblocks, and a coding order flag. Here, the partitioning mode includes a Quadtree (QT) partitioning mode and a Vertical and Horizontal (VH) partitioning mode. The method also includes partitioning the current block into the subblocks according to the partitioning mode. The method also includes determining a coding order of the subblocks based on the coding order flag. The method also includes reconstructing the subblocks sequentially in the coding order by using the intra-prediction mode.

Another aspect of the present disclosure provides a method performed by a video encoding apparatus for encoding subblocks partitioned from a current block. The method includes determining an intra-prediction mode of the current block, a partitioning mode of the subblocks, and a coding order flag. Here, the partitioning mode includes a Quadtree (QT) partitioning mode and a Vertical and Horizontal (VH) partitioning mode. The method also includes partitioning the current block into the subblocks according to the partitioning mode. The method also includes determining a coding order of the subblocks based on the coding order flag. The method also includes encoding the subblocks sequentially in the coding order by using the intra-prediction mode. The method also includes encoding the intra-prediction mode of the current block, the partitioning mode of the subblocks, and the coding order flag.

Yet another aspect of the present disclosure provides a computer-readable recording medium storing a bitstream generated by a video encoding method for encoding subblocks partitioned from a current block. The video encoding method includes determining an intra-prediction mode of the current block, a partitioning mode of the subblocks, and a coding order flag. Here, the partitioning mode includes a Quadtree (QT) partitioning mode and a Vertical and Horizontal (VH) partitioning mode. The video encoding method also includes partitioning the current block into the subblocks according to the partitioning mode. The video encoding method also includes determining a coding order of the subblocks based on the coding order flag. The video encoding method also includes encoding the subblocks sequentially in the coding order by using the intra-prediction mode. The video encoding method also includes encoding the intra-prediction mode of the current block, the partitioning mode of the subblocks, and the coding order flag.

As described above, the present disclosure provides a video coding method and an apparatus for providing reference samples efficiently and performing intra prediction on subblocks of a current block using the reference samples when a coding order of the subblocks is changed for performing intra prediction. Thus, the video coding method and the apparatus improve the video encoding efficiency and video quality.

DETAILED DESCRIPTION

Figure 1:
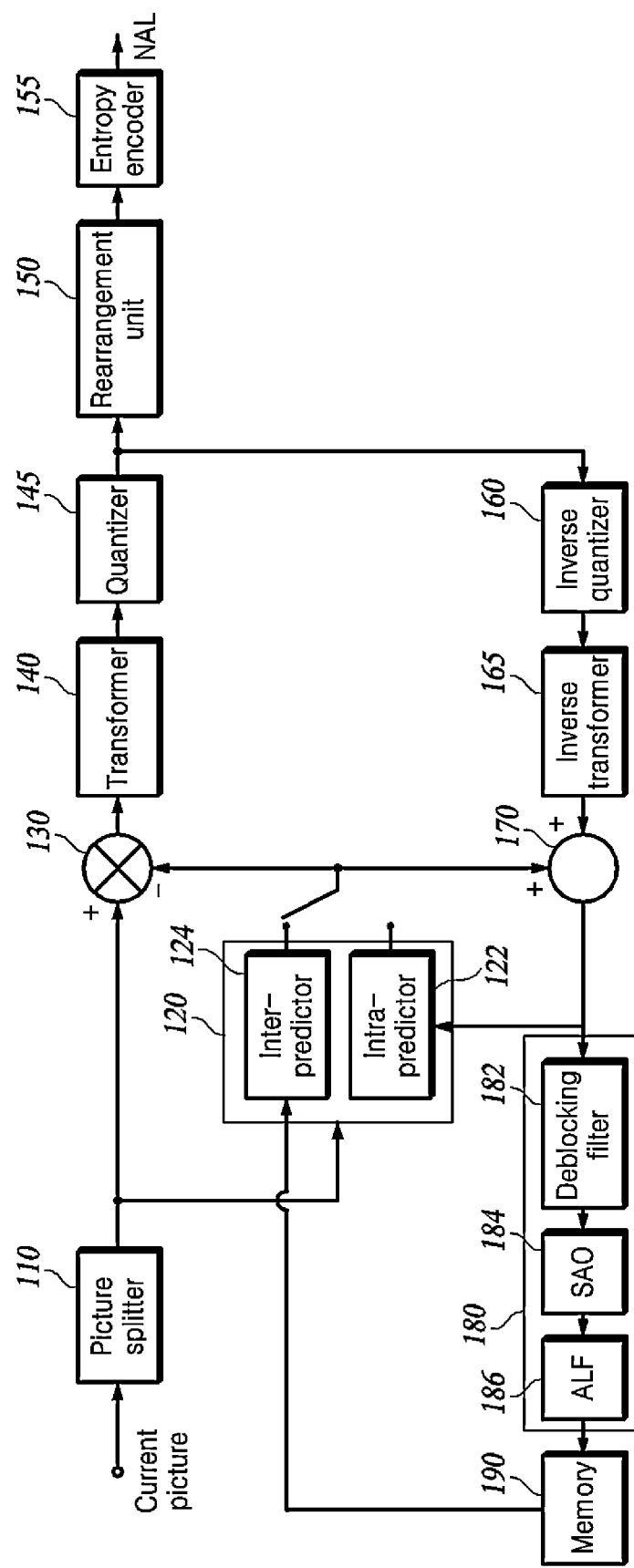
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
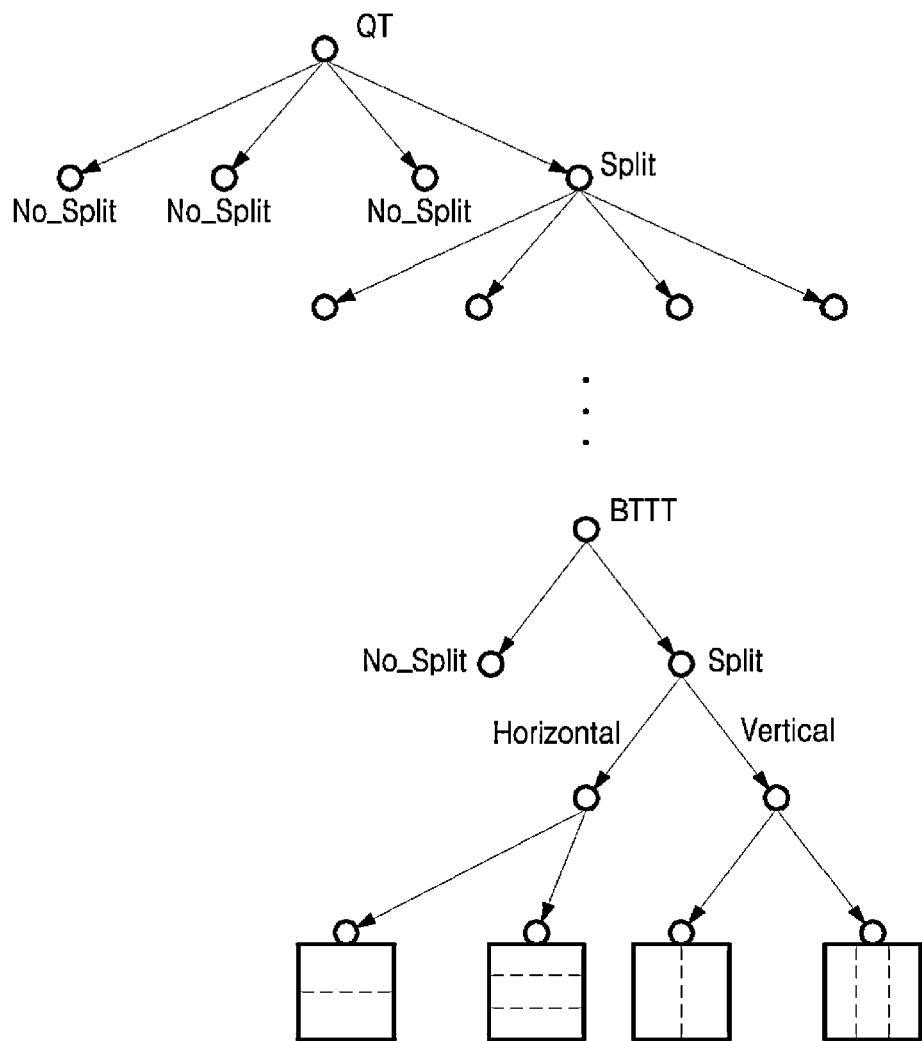
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
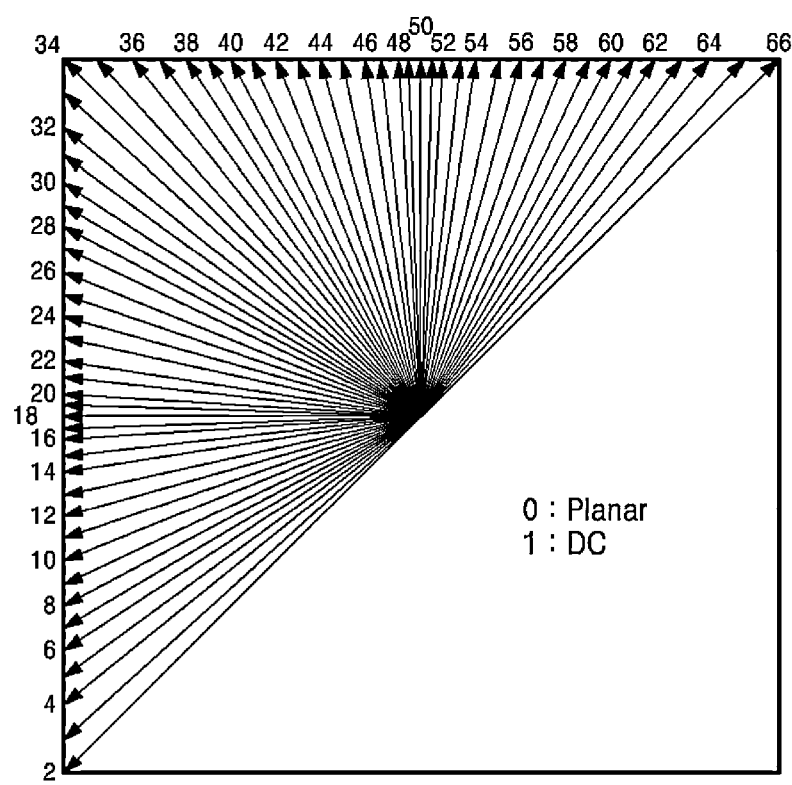
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
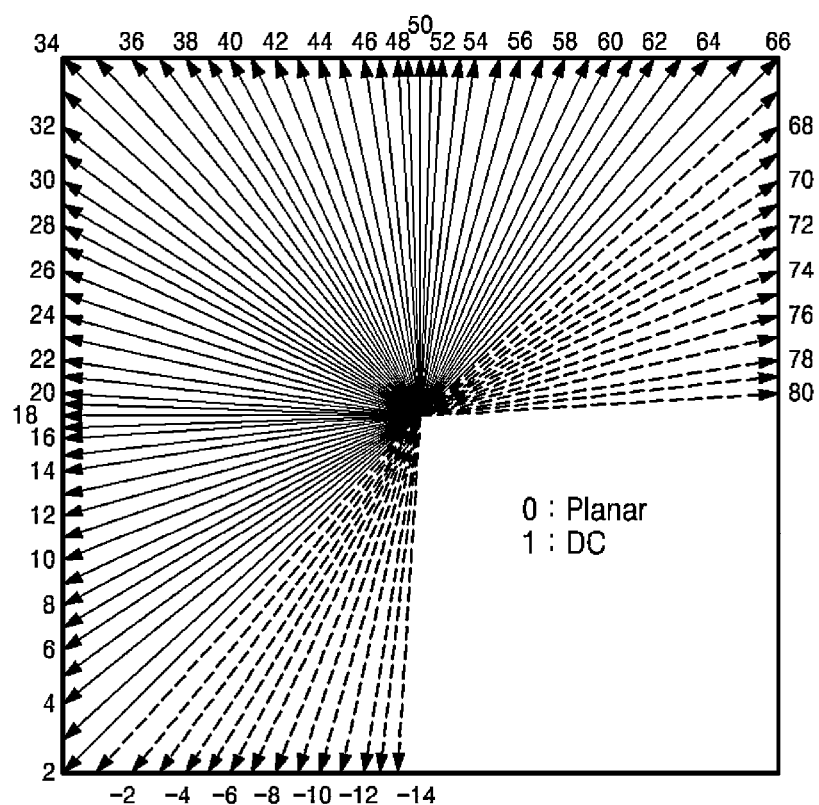

For efficient directional prediction for the current block having a rectangular shape, directional modes (#67 to #80, intra prediction modes #-1 to #-14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
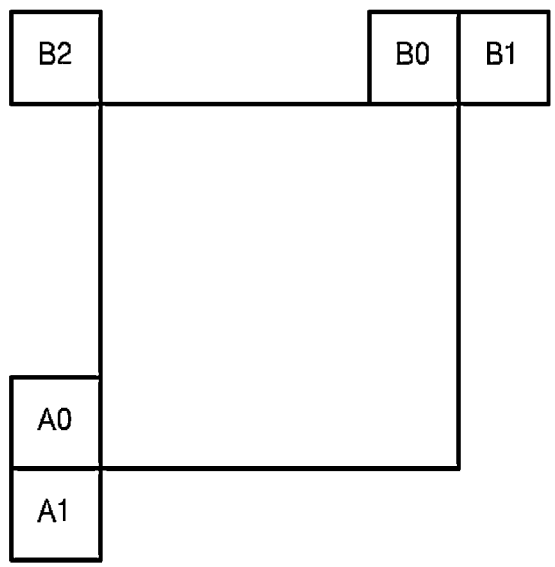
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
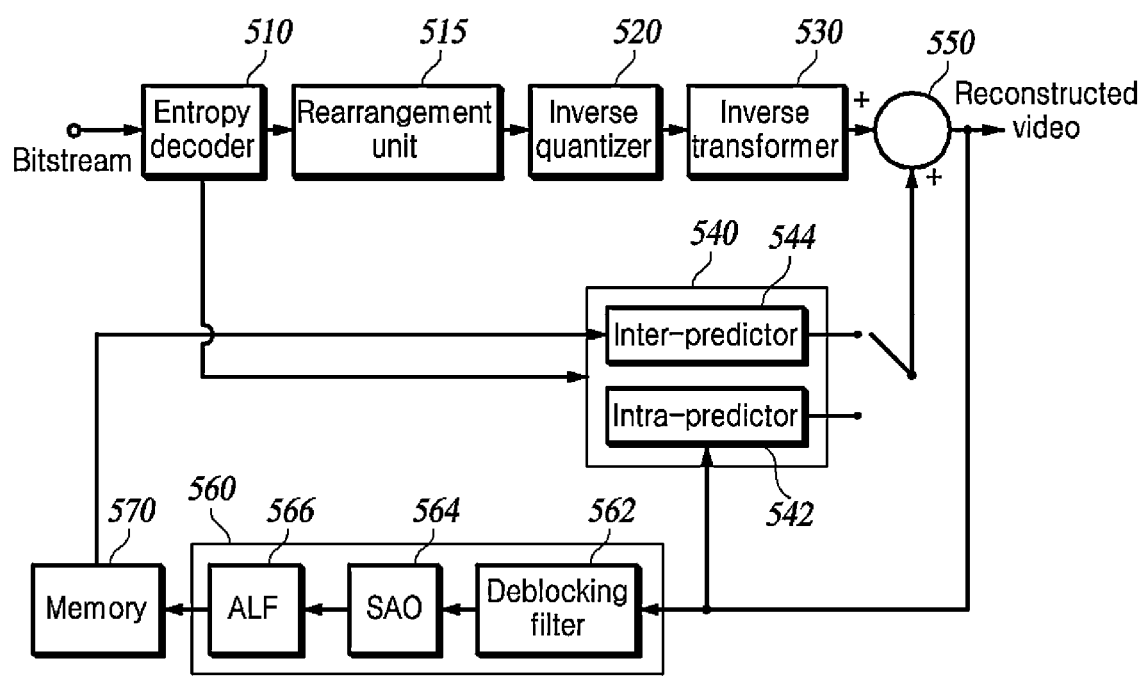
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus for providing reference samples efficiently and performing intra prediction on subblocks of a current block using the reference samples when a coding order of the subblocks is changed for performing intra prediction on the subblocks.

The following embodiments may be performed by the intra predictor 122 in the video encoding apparatus, and the intra predictor 542 in the video decoding apparatus.

The video encoding apparatus generate signaling information associated with the present embodiment in terms of optimizing bit rate distortion in the intra prediction of the current block. The video encoding apparatus may use the entropy encoder 155 to encode and transmit the signaling information to the video decoding apparatus. The video decoding apparatus may use the entropy decoder 510 to decode, from the bitstream, the signaling information related to the intra prediction of the current block.

In the following description, the term "target block" may be used interchangeably with the current block or coding unit (CU) as described above, or the 'target block' may mean a partial region of the coding unit.

Further, a value of true for a flag indicates a case of setting the flag to 1. Additionally, a value of false for a flag indicates a case of setting the flag to 0.

I. Intra Prediction Techniques

Intra prediction, as described above, is a method of predicting the current block by referring to samples that exist in the neighborhood of the current block to be encoded. In Versatile Video Coding (VVC) techniques, the intra-prediction modes of a luma block have subdivided directional modes (i.e., 2 to 66) in addition to non-directional modes (i.e., planar and DC), as illustrated in FIG. 3A. Furthermore, as added to the example in FIG. 3B, the intra-prediction mode of the luma block has directional modes (−14 to −1 and 67 to 80) based on wide-angle intra prediction (WAIP).

In addition, intra prediction may utilize prediction techniques such as Multiple Reference Line intra Prediction (MRLP), Position Dependent intra Prediction Combination (PDPC), Intra Sub-Partitions (ISP), Matrix-weighted Intra Prediction (MIP), and Most Probable Mode (MPM).

In the intra prediction process using MRLP, the video encoding/decoding apparatus may utilize Multiple Reference Lines (MRL) to use more reference lines. When MRL is applied, the video encoding/decoding apparatus may perform intra prediction for the current block by using samples from two additional lines at the top and left of the current block in addition to the original reference line. For a selection of a reference line when applying the MRL, an index (mrl_idx) indicating the reference line may be signaled to the video decoding apparatus.

In intra prediction, one of the rule-based prediction methods is Position Dependent intra Prediction Combination (PDPC). This means that a predictor may be generated based on a predetermined operation by utilizing the encoding information of the target block to be intra-predicted and the neighboring pixels spatially adjacent to the target block.

The PDPC modifies the generated prediction samples according to a particular intra-prediction mode to generate the intra predictor of the current block. Here, the particular intra-prediction mode includes, among the prediction modes illustrated in FIG. 3A, planar, DC, horizontal (prediction mode 18), vertical (prediction mode 50), a left-down diagonal directional mode (prediction mode 2) and 15 directional modes proximate to prediction mode 2, and a right-up diagonal directional mode (prediction mode 66) and 15 directional modes proximate to prediction mode 66.

In PDPC, for the prediction samples of the current block generated according to a particular intra-prediction mode, prediction samples may be generated by adjusting the value for each pixel using predetermined weights and position information of neighboring pixels.

The Intra Sub-Partitions (ISP) technique may subdivide the current block into smaller blocks of the same size and then may share the intra-prediction mode across the subblocks, but apply a transform to each subblock. The subdivision of the block may be performed in a horizontal or vertical direction.

In the following description, the large block before being subdivided is referred to as the current block, and each of the subdivided smaller blocks is referred to as a subblock.

When subdividing the current block in the horizontal or vertical direction, if the size of the current block is too small, the encoding efficiency of the subdivided subblocks may be rather reduced, or the size of the subblocks may be smaller than the minimum unit for transform, even disabling transforming. To prevent this from happening, the application of the ISP may be limited by checking the size of the subblock obtained after partitioning, i.e., if the number of pixels in the split subblock is 16 or more, subdivision may be applied. For example, if the current block is 4×4, no ISP is applied. A block with a size of 4×8 or 8×4 may be split into two subblocks with the same shape and size, which is called a Half Split. A block of any other size may be split into four subblocks of the same shape and size, which is called a Quarter Split.

A predictor may be generated based on a predefined matrix operation, using the encoding information of the current block to be intra-predicted and the current block's neighboring pixels. This rule-based prediction method is referred to as Matrix-weighted Intra Prediction (MIP).

The MIP generates all or part of the intra predictor by using a predefined matrix operation. If part of the predictor is generated, the MIP may further perform interpolation for upsampling or upscaling with part of the predictor to generate final intra-prediction samples equal to the size of the current block.

Meanwhile, the MIP may select some of pixels that are spatially adjacent to the current block to serve as the current block's neighboring pixels. In another embodiment, the MIP may use, for matrix operations, the derived values by operations based on subsampling, downscaling, or the like.

The Most Probable Mode (MPM) technique utilizes the intra-prediction modes of neighbor blocks for intra prediction of the current block. The video encoding apparatus may improve the coding efficiency of the intra-prediction mode by transmitting the index for the MPM list in place of the index of the prediction mode.

II. Intra Prediction of Subblocks According to Present Disclosure

The following embodiments are described about a video decoding apparatus but may be equally well implemented in a video encoding apparatus.

Figure 6:
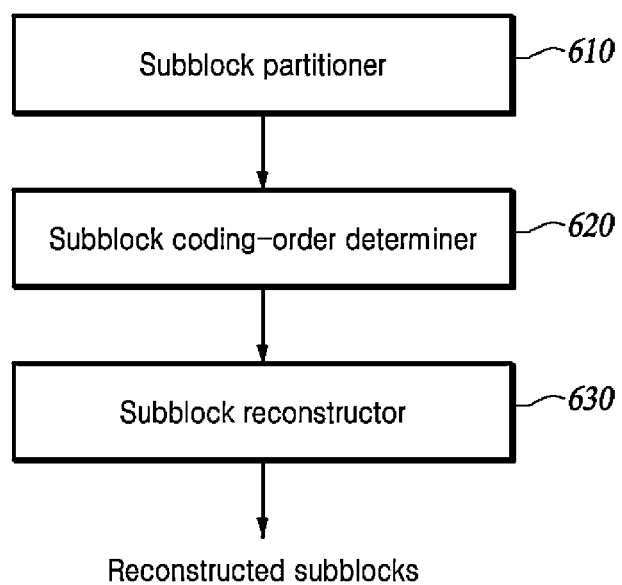
FIG. 6 is a block diagram of a video decoding apparatus for decoding subblocks, according to at least one embodiment of the present disclosure.

FIG. 6 is a block diagram of a video decoding apparatus for decoding subblocks, according to at least one embodiment of the present disclosure.

When the prediction mode of the current block is intra prediction, the video decoding apparatus may partition the current block into a plurality of subblocks and may decode the subblocks sequentially. The video decoding apparatus includes a subblock partitioner 610, a subblock coding-order determiner 620, and a subblock reconstructor 630.

The prediction mode of the subblocks may be the same mode as the decoded prediction mode of the current block. The video decoding apparatus performs entropy decoding, inverse quantization, and inverse transform of the parsed residual signals for each subblock and then adds the inverse transformed residual signals with the predicted signals to generate reconstructed pixel values. The reconstructed pixel values may then be used as reference samples for sequential prediction of the next subblock.

Figure 7:
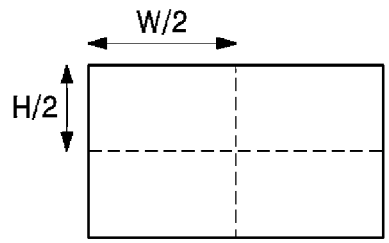
FIG. 7 is a diagram illustrating partitioning modes of subblocks according to at least one embodiment of the present disclosure.
Figure 7:
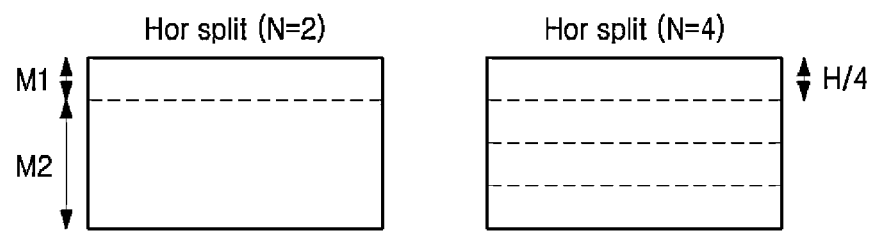
Figure 7:
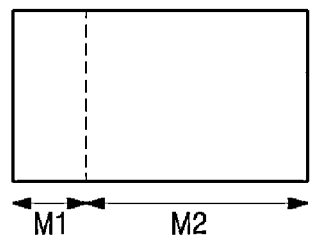
Figure 7:
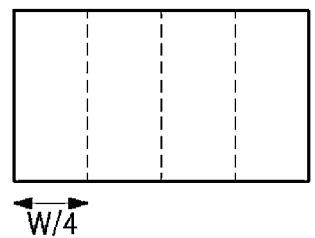

FIG. 7 is a diagram illustrating the partitioning modes of subblocks according to at least one embodiment of the present disclosure.

The subblock partitioner 610 determines whether and how to partition the current block into subblocks. The subblock partitioner 610 may parse a subblock split flag SB_flag from the bitstream to determine whether to partition into subblocks. The subblock partitioner 610 may parse the partitioning mode to determine how to partition the subblocks. For the current block, a Quadtree (QT) partitioning mode or a Vertical Horizontal (VH) partitioning mode may be applied, as illustrated in FIG. 7. The VH partitioning mode represents the splitting of N subblocks in the horizontal/vertical direction (Hor split and Ver split). In the illustration of FIG. 7, W represents the width of the current block and H represents the height of the current block.

When partitioning into two subblocks, the split ratio M1:M2 may be 1:1, 3:1, 1:3, and the like. The split ratio may be a ratio set by an agreement between the video encoding apparatus and the video decoding apparatus. Alternatively, the split ratio may be determined based on an intra-prediction mode or may be determined based on a parsed partitioning mode.

When in the VH partitioning mode, the subblock partitioner 610 may parse a flag (ver_flag) indicating a partitioning direction to determine a partition in a vertical direction or a horizontal direction. Additionally, the number N of subblocks may be implicitly determined based on the size (W and/or H) of the current block.

The partitioning method may be a partitioning mode. Further, if the partitioning mode is a VH partitioning mode, it may include a partitioning direction.

Figure 8A:
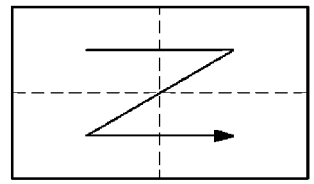
FIGS. 8A and 8B are diagrams illustrating coding orders according to at least one embodiment of the present disclosure.
Figure 8A:
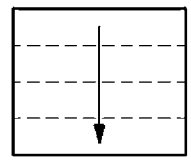
Figure 8A:
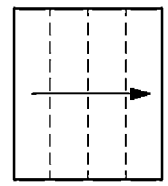
Figure 8B:
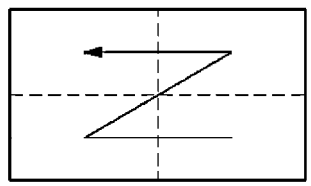
Figure 8B:
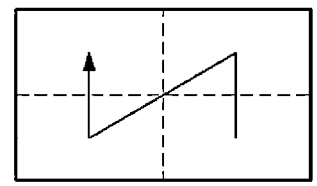
Figure 8B:
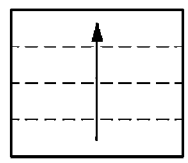
Figure 8B:
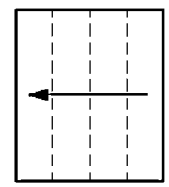

The subblock coding-order determiner 620 may parse the coding order flag (SB_order_flag) to determine the coding order of the subblocks. Embodiments of the coding order according to the SB_order_flag are shown in FIGS. 8A and 8B.

Figure 9A:
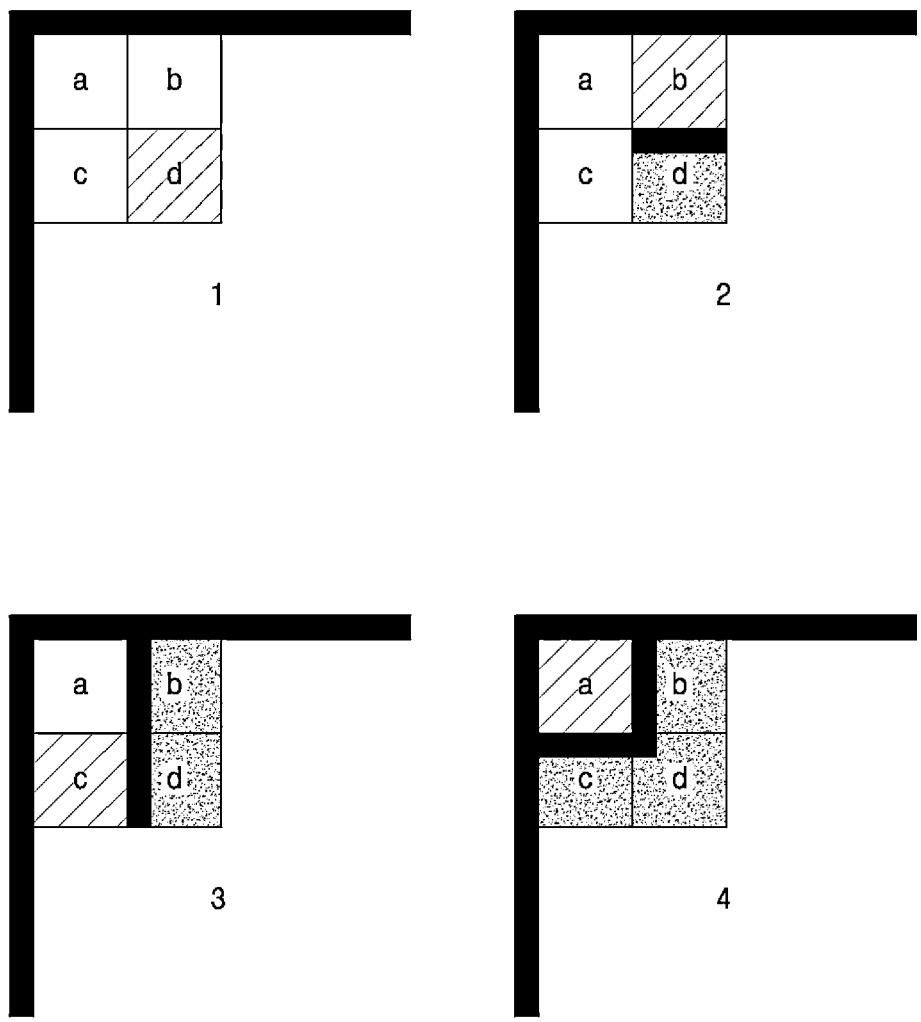
FIGS. 9A and 9B are diagrams illustrating reconstruction orders and reference samples based on quadtree (QT) partitioning mode, according to at least one embodiment of the present disclosure.
Figure 9B:
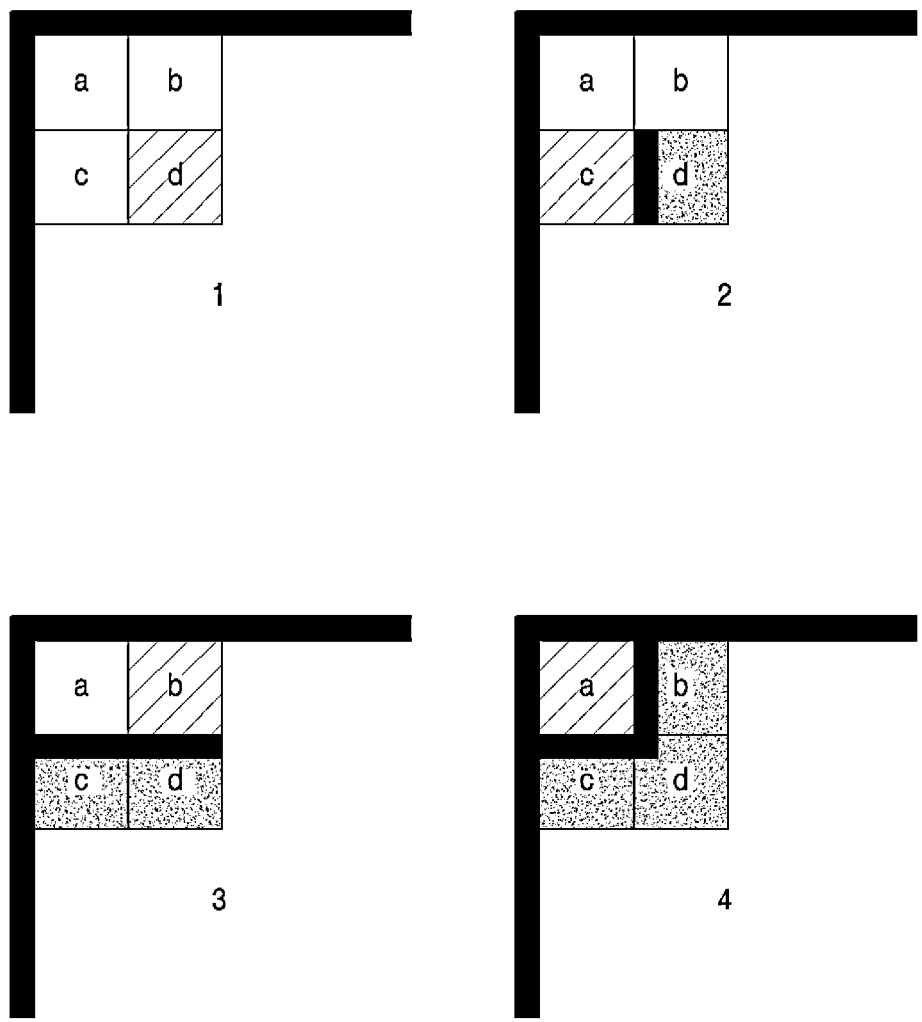

FIGS. 9A and 9B are diagrams illustrating reconstruction orders and reference samples based on QT partitioning mode, according to at least one embodiment of the present disclosure.

The subblock reconstructor 630 may be responsive to the current block being divided into subblocks according to the quadtree partitioning mode and the SB_order_flag being 1 for sequentially reconstructing the subblocks in the coding order as illustrated in FIG. 9A or FIG. 9B. Such coding order may be determined by an agreement between the video encoding apparatus and the video decoding apparatus.

The subblock reconstructor 630 performs the reconstruction sequentially on a subblock basis. For the reconstruction of the current subblock, the subblock reconstructor 630 may use the reconstruction samples of the previous subblocks as reference samples for the intra prediction of the current subblock. Additionally, when quadtree partitioning was performed, as illustrated in FIGS. 9A and 9B, the subblock reconstructor 630 may utilize the top and left reconstruction samples of the current block as reference samples for the bottom right subblock.

Figure 10:
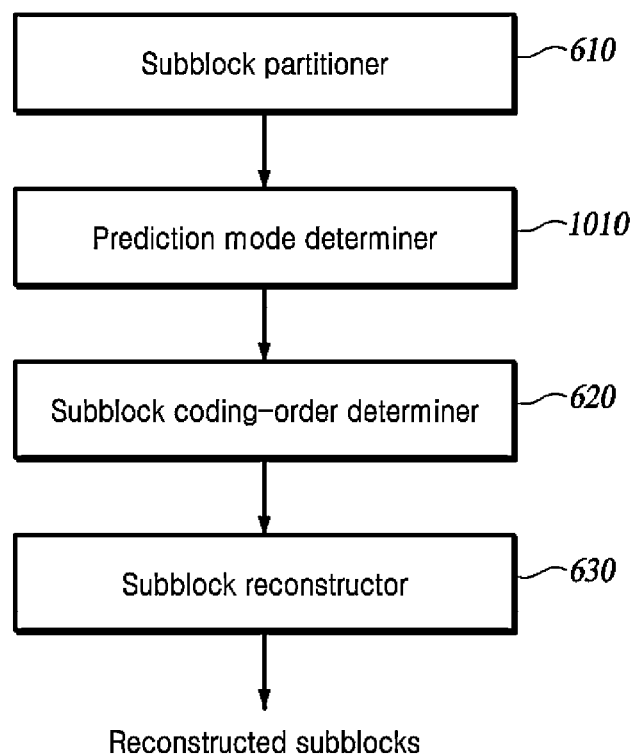
FIG. 10 is a block diagram of a video decoding apparatus for decoding subblocks, according to another embodiment of the present disclosure.

FIG. 10 is a block diagram of a video decoding apparatus for decoding subblocks, according to another embodiment of the present disclosure.

In one example, the video decoding apparatus may implicitly determine the coding order of the quadtree partitioning based on the intra-prediction mode. To determine the intra-prediction mode, the video decoding apparatus may further include a prediction mode determiner 1010.

When the quadtree partitioning is determined by the subblock partitioner 610, the subblock coding-order determiner 620 may implicitly determine the reconstruction order according to the current block's intra-prediction mode M parsed by the prediction mode determiner 1010. Furthermore, the subblock coding-order determiner 620 may derive the reconstruction order by using the prediction mode according to the WAIP.

Figure 11A:
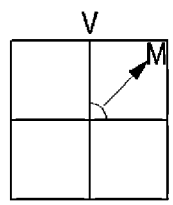
FIGS. 11A and 11B are diagrams illustrating reconstruction orders based on QT partitioning mode, according to at least one embodiment of the present disclosure.
Figure 11A:
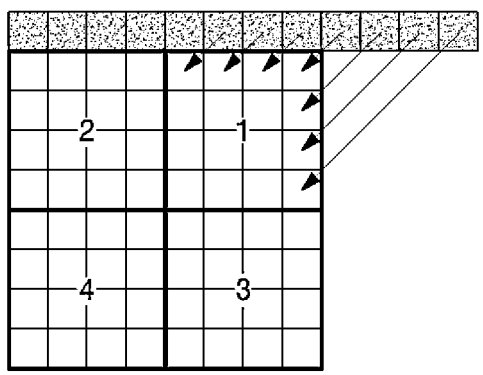
Figure 11A:
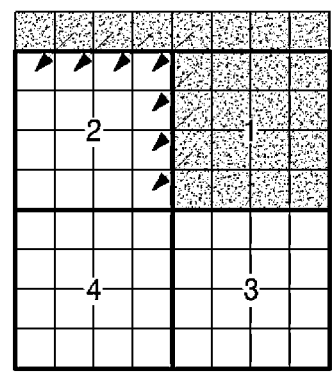
Figure 11A:
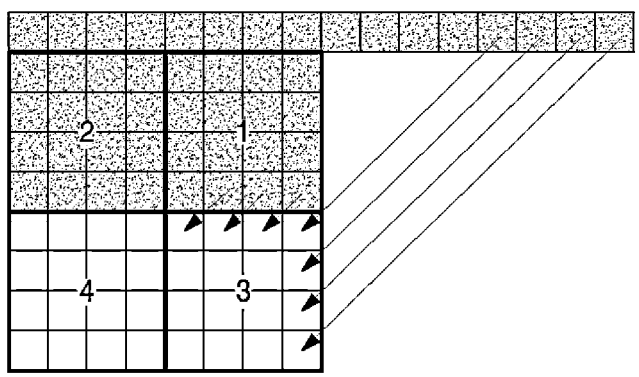
Figure 11A:
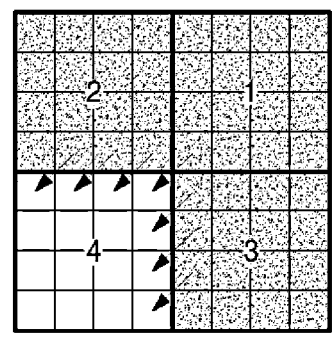

In one example, if the directional mode is M>V (Vertical mode, mode 50 in the example of FIG. 3A), the subblocks may be reconstructed in the order illustrated in FIG. 11A. In the example of FIG. 11A, the order of reconstruction is 1-2-3-4. In addition, subblocks may be reconstructed in the order 1-3-2-4, according to some embodiments.

Figure 11B:
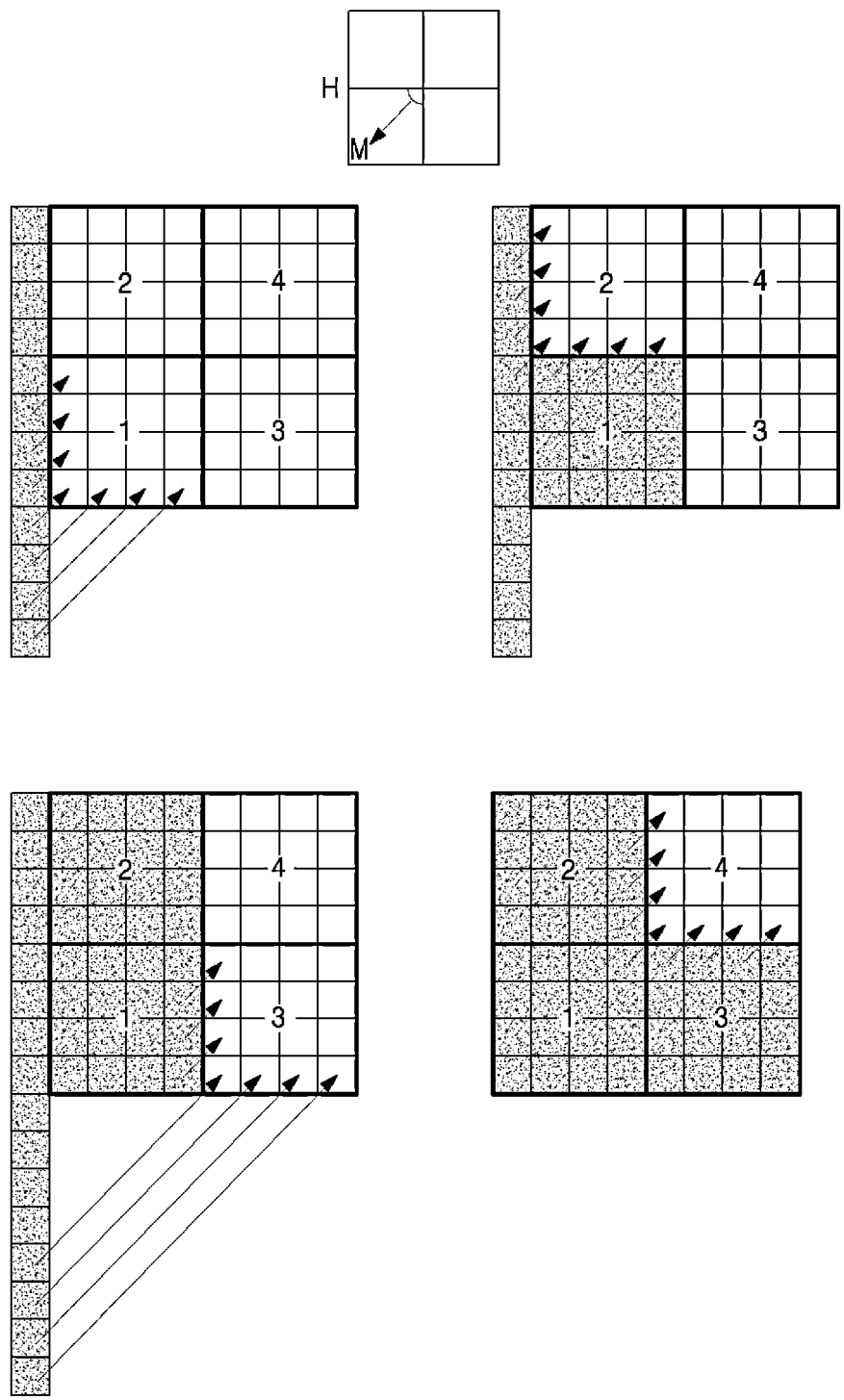

As another example, when the directional mode is M<H (Horizontal mode, mode 18 in the example of FIG. 3A), the subblocks may be reconstructed in the order illustrated in FIG. 11B. In the example of FIG. 11B, the order of reconstruction is 1-2-3-4. Further, according to some embodiments, subblocks may be reconstructed in the order 1-3-2-4.

As described above, the subblock reconstructor 630 sequentially reconstructs each subblock according to the partitioning method and coding order determined by the subblock partitioner 610 and the subblock coding-order determiner 620. The subblock reconstructor 630 reconstructs the sample values of the subblock by reconstructing the residual signals according to the transform unit (TU) in the subblock and adding the reconstructed residual signals to the predicted values. At this time, the reconstruction of the residual signals is performed sequentially in the order of entropy decoding, inverse quantization, and inverse transform.

Figure 12:
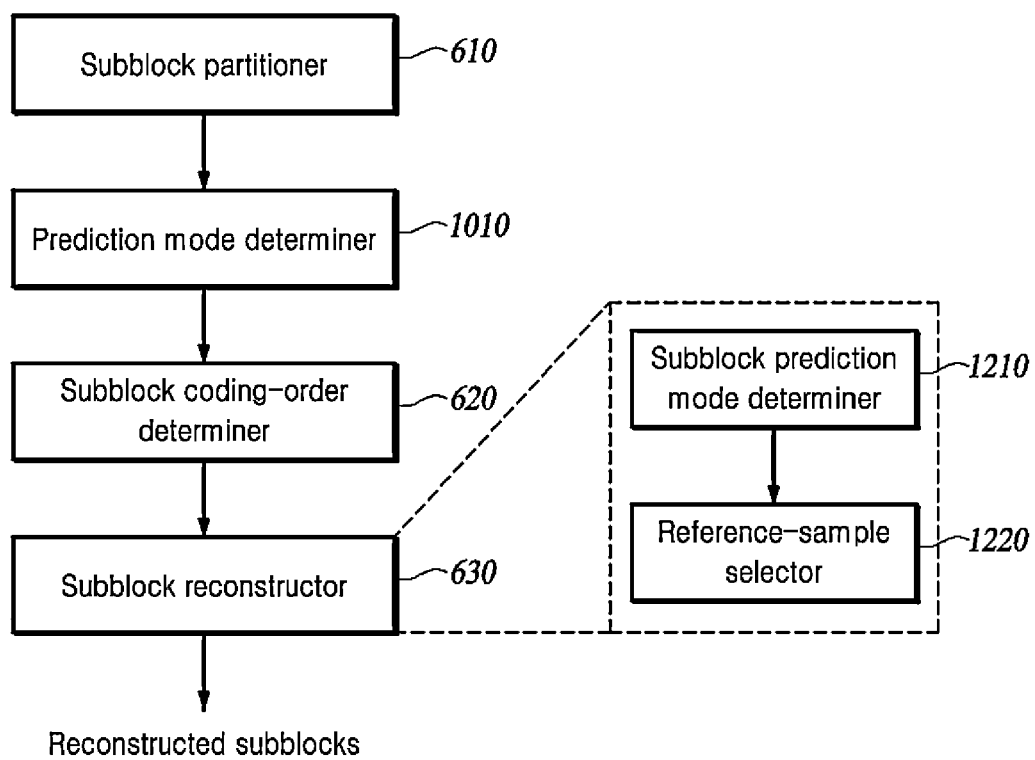
FIG. 12 is a block diagram of a video decoding apparatus for decoding subblocks, according to yet another embodiment of the present disclosure.

FIG. 12 is a block diagram of a video decoding apparatus for decoding subblocks, according to yet another embodiment of the present disclosure.

In one example, when SB_order_flag=1, the subblock reconstructor 630 may include a subblock prediction mode determiner 1210 and a reference-sample selector 1220.

The subblock prediction mode determiner 1210 may determine an intra-prediction mode of the current subblock based on a partitioning method of the subblocks and the position of the current subblock. The reference-sample selector 1220 may generate reference samples to be used for intra prediction of the current subblock based on the prediction mode. The subblock reconstructor 630 may perform intra prediction on the current subblock based on the reference samples to generate prediction samples and then may add the generated prediction samples and the reconstructed residual signals. Thus, the subblock reconstructor 630 may reconstruct the sample values of the current subblock.

Further, using the components illustrated in FIG. 12, the video decoding apparatus may perform a method of dividing the current block into a plurality of subblocks and decoding the subblocks sequentially. Additionally, such a method may be included as part of a method performed by the video encoding apparatus for encoding the current block.

In one example, if the subblocks are quadtree partitioned and SB_order_flag=1, the video decoding apparatus may perform intra prediction by using reference samples as illustrated in FIG. 9A or 9B for each subblock. In this case, subblock d in the bottom right corner may be predicted in a specified prediction mode according to an agreement between the video encoding apparatus and the video decoding apparatus. Here, the specified prediction mode may be, for example, DC, planar, IBC mode, or the like.

Further, the coded_block_flag of the bottom right subblock for QT_order1 may be implicitly derived as 1. Here, the coded_block_flag is set to 1 if there is a non-zero quantized coefficient in the block and is set to 0 if all quantized coefficients are zero.

Further, based on the location of the quadtree partitioned subblocks, transform and inverse transform may be performed by using an agreed-upon kernel between the video encoding apparatus and the video decoding apparatus.

In one embodiment, each quadtree partitioned subblock may be intra-predicted by using a bilinear interpolation-based prediction.

Figure 13:
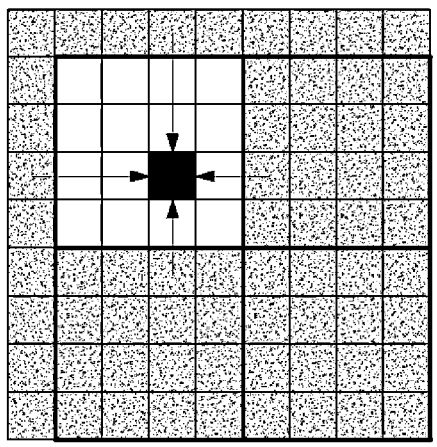
FIG. 13 is a diagram illustrating reference samples utilized for bilinear interpolation, according to at least one embodiment of the present disclosure.
Figure 13:
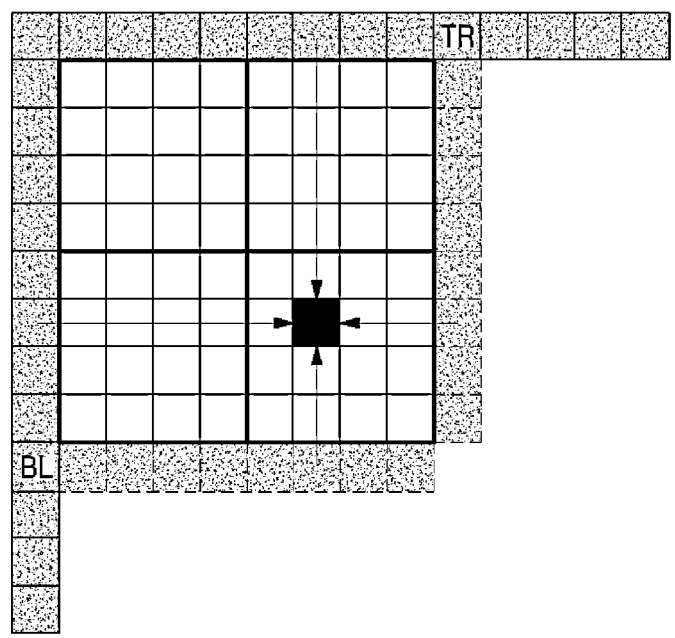

When bilinear interpolation-based prediction is performed, the reference samples used for subblocks a and d are as illustrated in FIG. 13. For subblock d, the right reference samples may be generated by copying the TR sample, and the bottom reference samples may be generated by copying the BL sample.

For subblocks b and c that follow the reconstruction order of the quadtree partitioned subblocks, a bilinear interpolation-based prediction may be performed by using the following reference samples.

First, the case of utilizing the reconstruction order as illustrated in FIG. 9A is described.

Figure 14A:
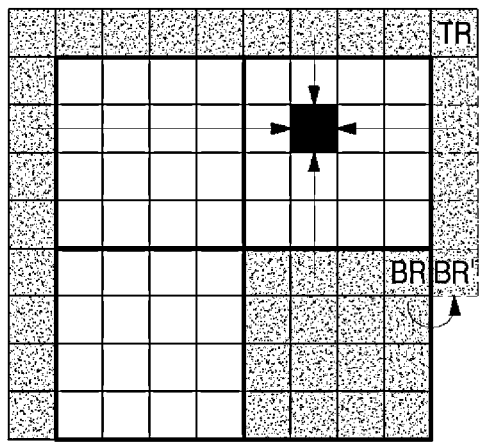
FIGS. 14A and 14B are diagrams illustrating reference samples utilized for bilinear interpolation, according to another embodiment of the present disclosure.
Figure 14A:
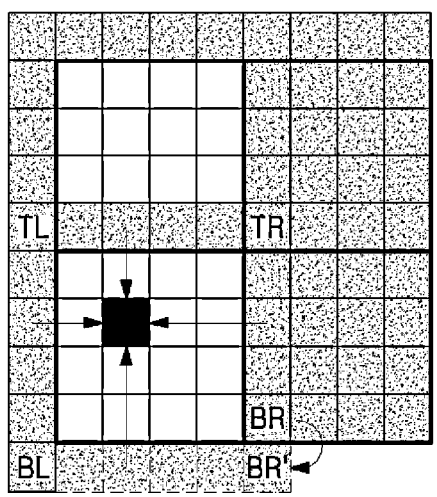

For subblock b, the right reference samples may be generated by copying the sample value of TR and BR, whichever is closer, as illustrated in FIG. 14A. Alternatively, the right reference samples may be generated by linearly interpolating TR and BR' obtained by copying the BR value.

For subblock c, the top reference samples may be generated by copying the sample value of TL and TR, whichever is closer, as in the example of FIG. 14A. Alternatively, the top reference samples may be generated by linearly interpolating TL and TR. On the other hand, the bottom reference samples may be generated by copying the closer sample value of BL and BR, as shown in the example of FIG. 14A. Alternatively, the bottom reference samples may be generated by linearly interpolating BL and BR'. As another example, a bilinear interpolation-based prediction may be performed by using the top reference samples of the current block as the top reference samples of subblock c.

The following describes the case of utilizing the reconstruction order as illustrated in FIG. 9B.

Figure 14B:
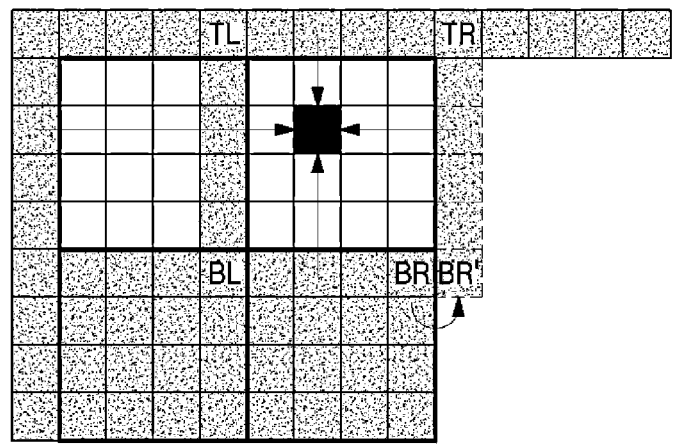
Figure 14B:
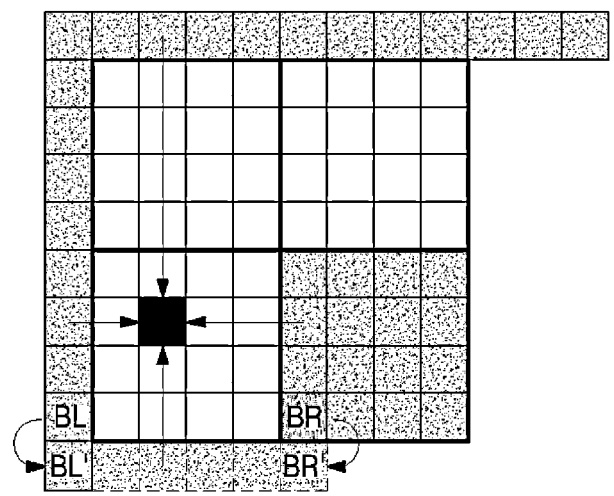

For subblock b, the left reference samples may be generated by copying the sample value of TL and BL, whichever is closer, as illustrated in FIG. 14B. Alternatively, the left reference samples may be generated by linearly interpolating TL and BL. On the other hand, the right reference samples may be generated by copying the closer sample value of TR and BR, as shown in the example of FIG. 14B. Alternatively, the right reference samples may be generated by linearly interpolating TR and BR'. As another example, a bilinear interpolation-based prediction may be performed by using the left reference samples of the current block as the left reference samples of subblock b.

For subblock c, the bottom reference samples may be generated by copying the sample value of BL and BR, whichever is closer, as shown in the example of FIG. 14B. Alternatively, the bottom reference samples may be generated by linearly interpolating BL' and BR'.

Figure 15A:
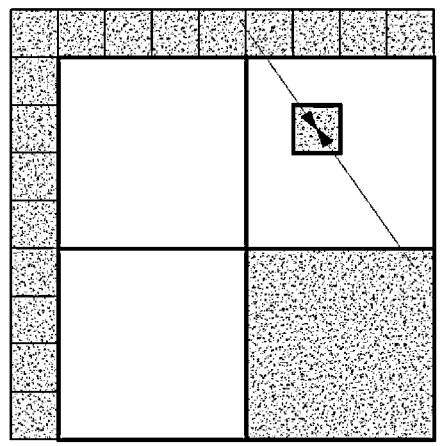
FIGS. 15A and 15B are diagrams illustrating reference samples utilized for linear interpolation, according to at least one embodiment of the present disclosure.
Figure 15A:
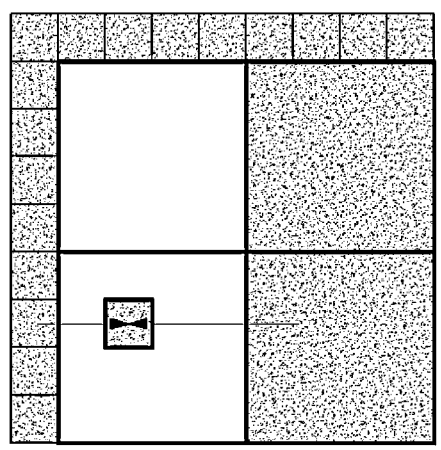
Figure 15A:
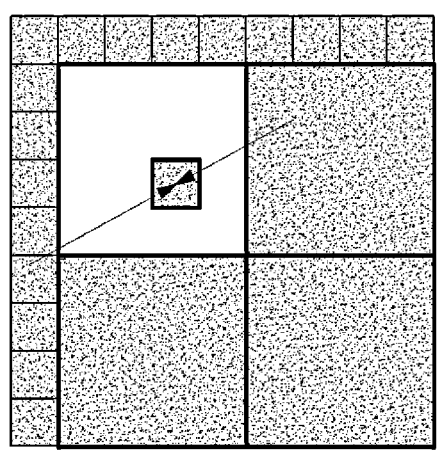
Figure 15B:
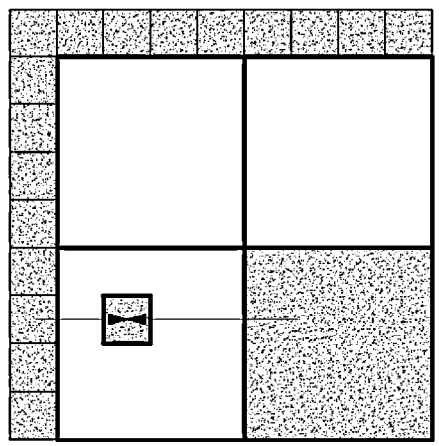
Figure 15B:
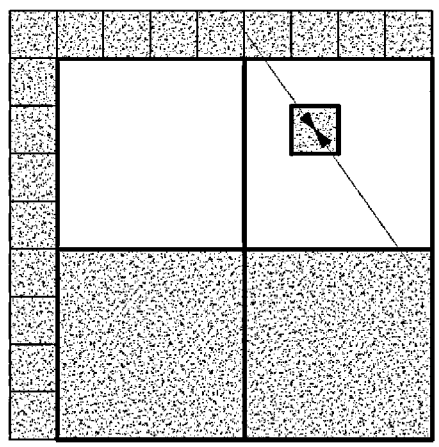
Figure 15B:
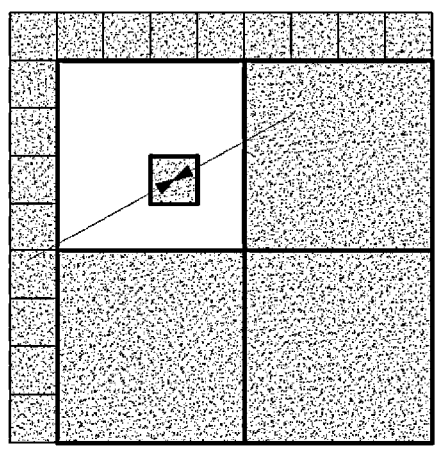

As another example, for subblocks a, b, and c, if the prediction mode is directional mode M, the final predicted pixels may be generated by applying distance-based linear interpolation to the predicted pixels in M mode and the predicted pixels in M' mode rotated 180 degrees from M mode. When the reconstruction order is used as illustrated in FIG. 9A, linear interpolation may be performed on the two directional prediction samples by using reference samples of previously reconstructed subblocks, as illustrated in FIG. 15A. When the reconstruction order is used as illustrated in FIG. 9B, linear interpolation may be performed on the two directional prediction samples, as illustrated in FIG. 15B. Here, in the case of the bottom right subblock, prediction may be performed thereon in a specified mode by an agreement between the video encoding apparatus and the video decoding apparatus by using the top and left reference samples of the current block. Alternatively, intra prediction may be performed on the bottom right subblock by using the top and left reference samples of the current block according to the intra-prediction mode of the current block.

Alternatively, if no reference samples in direction of the M' mode exist, prediction of the current block may be performed in M mode. Alternatively, after the nearest available reference sample is padded, a linear interpolation prediction between the predicted samples along the two directional modes may be performed.

Figure 16:
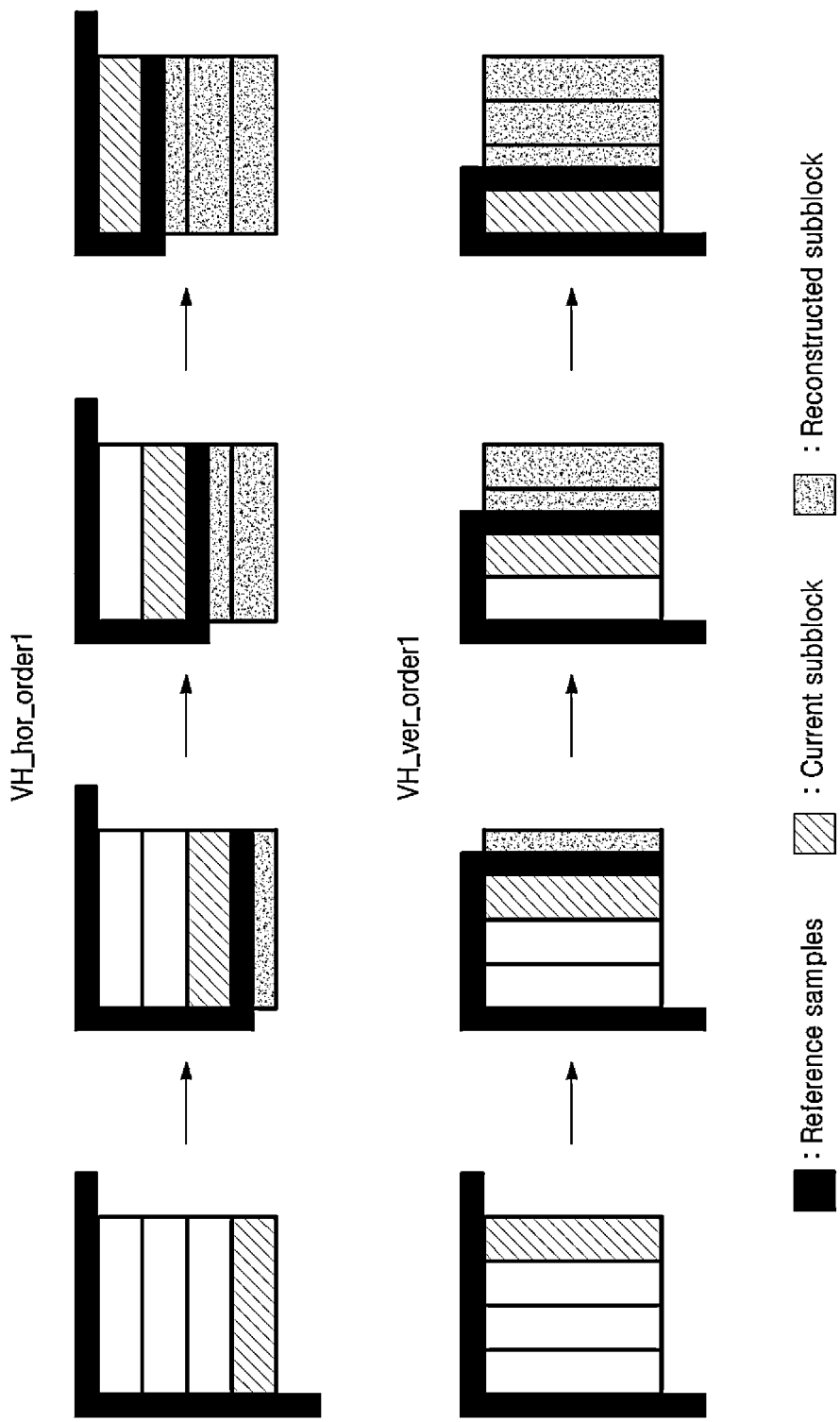
FIG. 16 is a diagram illustrating reference samples of subblocks partitioned in vertical and horizontal (VH) partitioning mode, according to at least one embodiment of the present disclosure.

FIG. 16 is a diagram illustrating reference samples of subblocks partitioned in VH partitioning mode, according to at least one embodiment of the present disclosure.

On the other hand, when the subblocks are split in VH partitioning mode, intra prediction may be performed on a subblock basis by using reference samples as illustrated in FIG. 16. In the case of VH_hor_order1, the bottom subblock may use the top and left reconstruction samples of the current block as reference samples. The remaining subblocks may use the reconstruction samples of the previous subblock as additional reference samples. Additionally, in the case of VH_ver_order1, the rightmost subblock may use the top and left reconstruction samples of the current block as reference samples. The remaining subblocks may use the reconstruction samples of the previous subblocks as additional reference samples.

In one embodiment, with VH_hor_order1, the bottom subblock may be predicted in a specified prediction mode based on an agreement between the video encoding apparatus and the video decoding apparatus. Further, with VH_ver_order1, the rightmost subblock may be predicted in a specified prediction mode according to an agreement between the video encoding apparatus and the video decoding apparatus. Here, the specified prediction mode may be, for example, DC, planar, IBC mode, or the like.

In another embodiment, each VH-partitioned subblock may be intra-predicted by using a bilinear interpolation-based prediction.

Figure 17A:
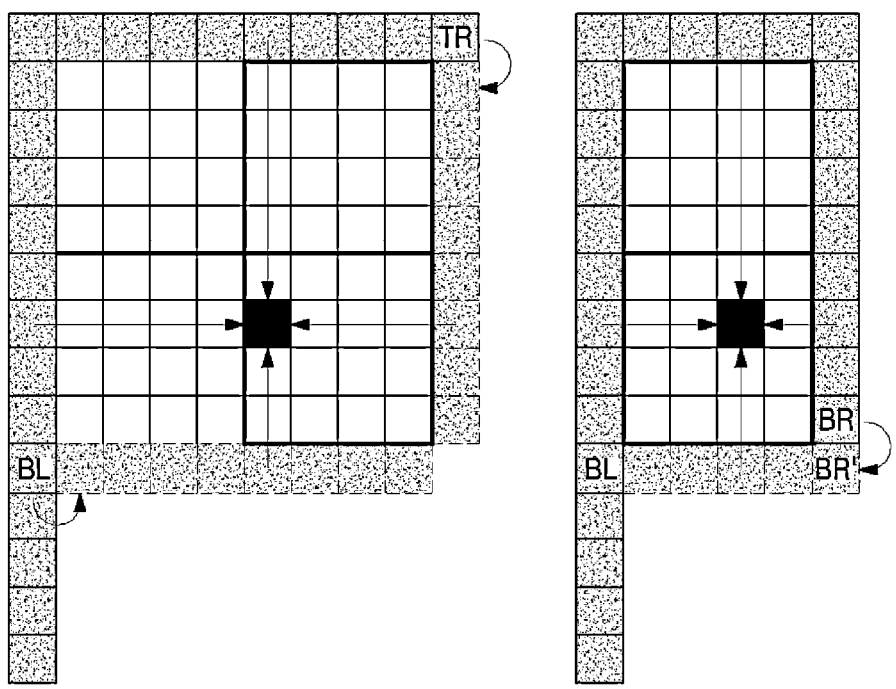
FIGS. 17A and 17B are diagrams illustrating reference samples utilized for bilinear interpolation, according to yet another embodiment of the present disclosure.

First, using the example of FIG. 17A, the case of VH_ver_order1 is described.

As illustrated in FIG. 17A, bottom reference samples may be generated based on the BL reference sample and/or the BR reference sample. For the first predicted rightmost blocks, after the right reference samples are generated based on the TR samples and the bottom reference samples are generated based on the BL samples, a bilinear interpolation prediction may be performed. For subsequent predicted blocks, after the bottom reference samples are generated by linearly interpolating the BR samples and the BR' sample obtained by copying the BR sample, a bilinear interpolation prediction may be performed.

Figure 17B:
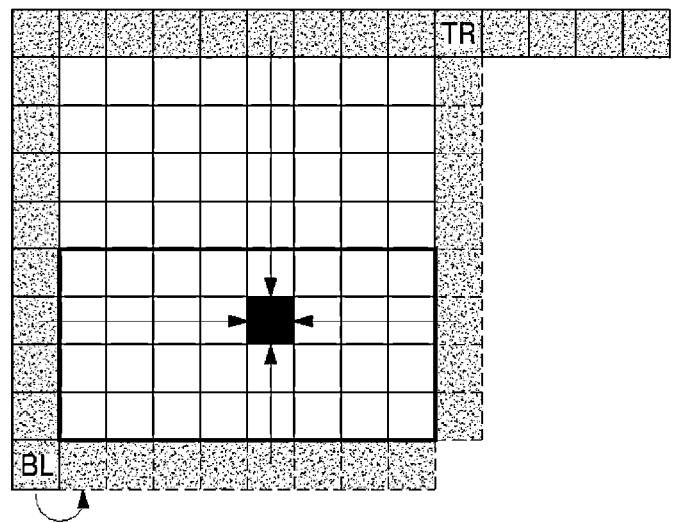
Figure 17B:
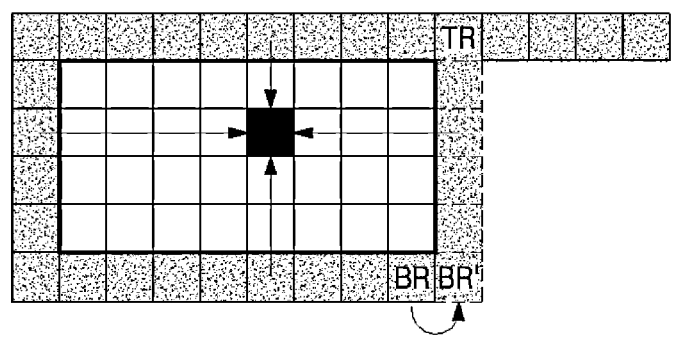

The following describes the case of VH_hor_order1 by using the example of FIG. 17B.

As illustrated in FIG. 17B, right reference samples may be generated based on the TR reference sample and/or the BR reference sample. For the first predicted bottom block, after the right reference samples are generated based on the TR samples and the bottom reference samples are generated based on the BL samples, a bilinear interpolation prediction may be performed. For subsequent predicted blocks, a bilinear interpolation prediction may be performed after the right reference samples are generated by linearly interpolating the TR sample and the BR' sample obtained by copying the BR sample.

In another embodiment, each VH-partitioned subblock may be intra-predicted by using a linear interpolation-based prediction.

When both top and bottom reference samples or both left and right reference samples are available for use, a weighted sum prediction may be performed based on the distance between the reference samples and the predicted pixels. In this case, a linear interpolation prediction may be performed when a particular directional mode is established based on the location of the available reference samples. Additionally, if the positions of the reference samples used for the linear interpolation prediction are not integer positions, the present disclosure may interpolate the reference samples by using the nearest integer pixels or neighboring reference samples and then may use the interpolated reference samples to perform the linear interpolation prediction.

Figure 18A:
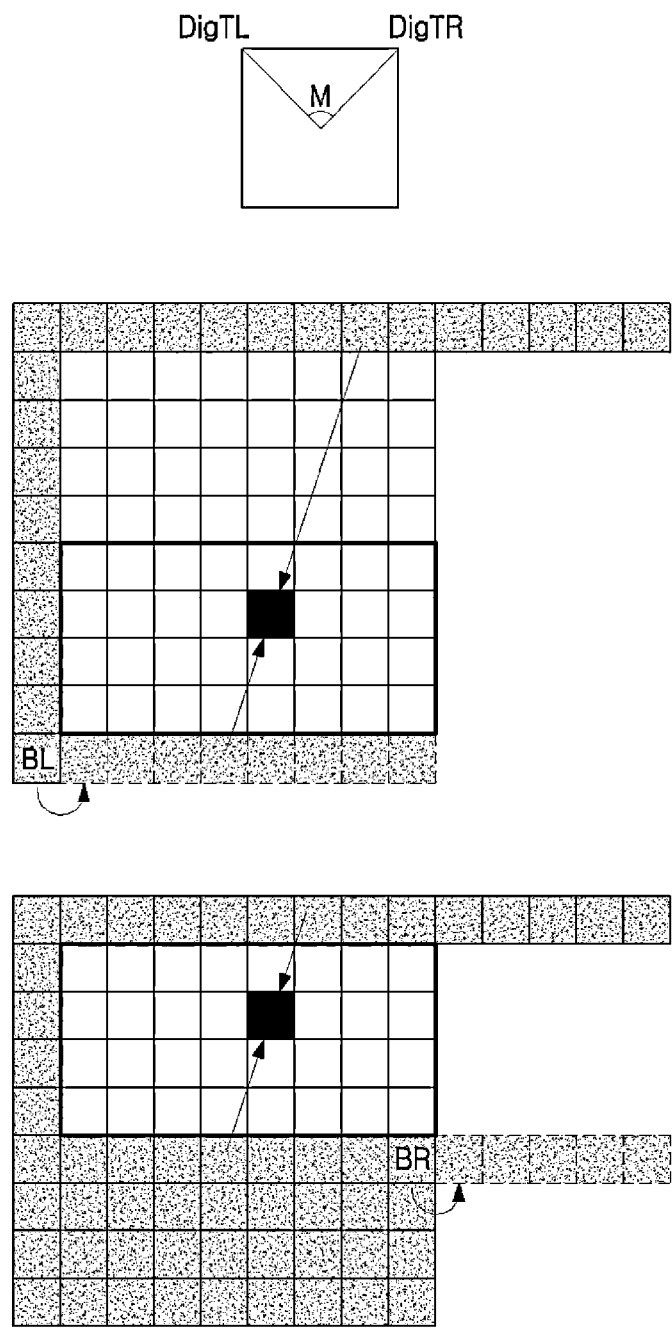
FIGS. 18A and 18B are diagrams illustrating reference samples utilized for linear interpolation, according to another embodiment of the present disclosure.

For example, for VH_hor_order1 and a directional mode in the range DigTL≤M≤DigTR, linear interpolation prediction may be used as illustrated in FIG. 18A. For the first predicted bottom block, prediction may be performed based on the M mode, or linear interpolation prediction may be performed after the bottom reference samples are generated based on the BL reference sample. For subsequent predicted blocks, when the bottom right reference samples are needed in a certain directional mode, linear interpolation prediction may be performed after the bottom right reference samples are generated based on the BR sample.

Figure 18B:
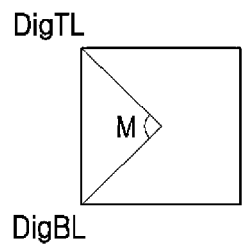
Figure 18B:
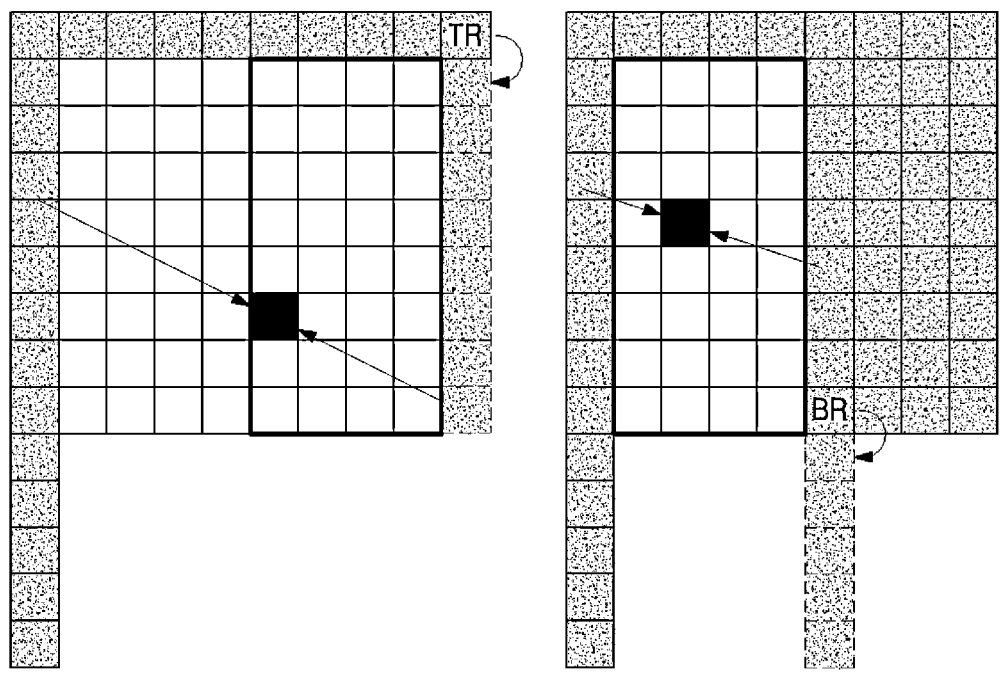

Additionally, for VH_ver_order1 and a directional mode in the range of DigTR≤M≤DigBR, linear interpolation prediction may be used, as illustrated in FIG. 18B. For the first predicted rightmost block, prediction may be performed based on the M mode, or linear interpolation prediction may be performed after the right reference samples are generated based on the TR reference sample. For the subsequently predicted blocks, when the bottom right reference samples are required by the directional mode, a linear interpolation prediction may be performed after the bottom right reference samples are generated based on the BR samples.

The following describes a method of intra-predicting each subblock by using DC mode for VH partitioning mode. First, the case where the reconstruction order is VH_ver_order1 is described.

Figure 19A:
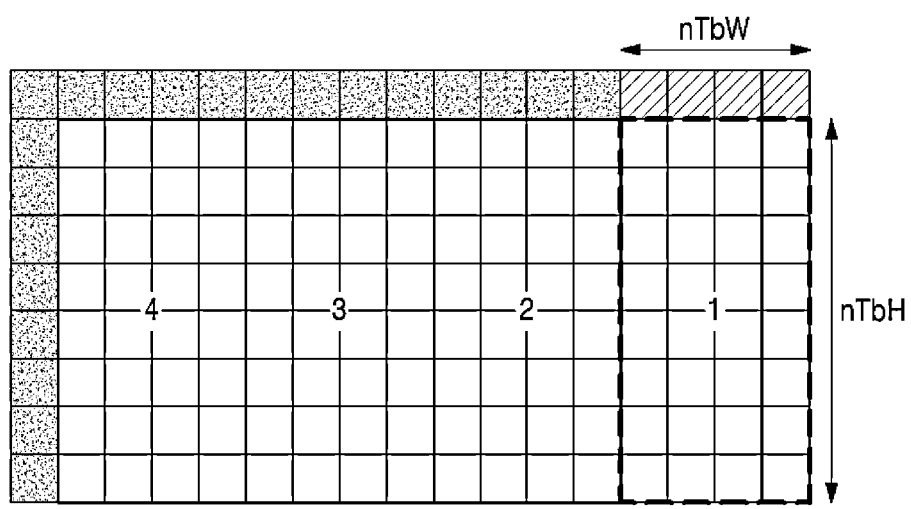
FIGS. 19A and 19B are diagrams illustrating reference samples utilized for direct current (DC) prediction, according to at least one embodiment of the present disclosure.

The rightmost subblock that is reconstructed first may be intra-predicted by using the DC mode, as expressed in Equation 1 and Equation 2. At this time, the position of the reference samples utilized for prediction is at the top, as illustrated in FIG. 19A.

$$\text{DCVal} = (\Sigma_{x'=0}^{nTbW-1} p[x'][-1] + (nTbW >> 1)) >> \log_2 nTbW \qquad \text{[Equation 1]}$$

$$\text{pred}[x][y] = \text{DCVal}, x=0, \ldots, nTbW-1, y=0, \ldots, nTbH-1 \qquad \text{[Equation 2]}$$

Here, p[x][y] represents the pixel value at position (x,y) and p[0][0] represents the top left pixel value of the subblock. Further, nTbW is the width of the subblock and nTbH is the height of the subblock.

Figure 19B:
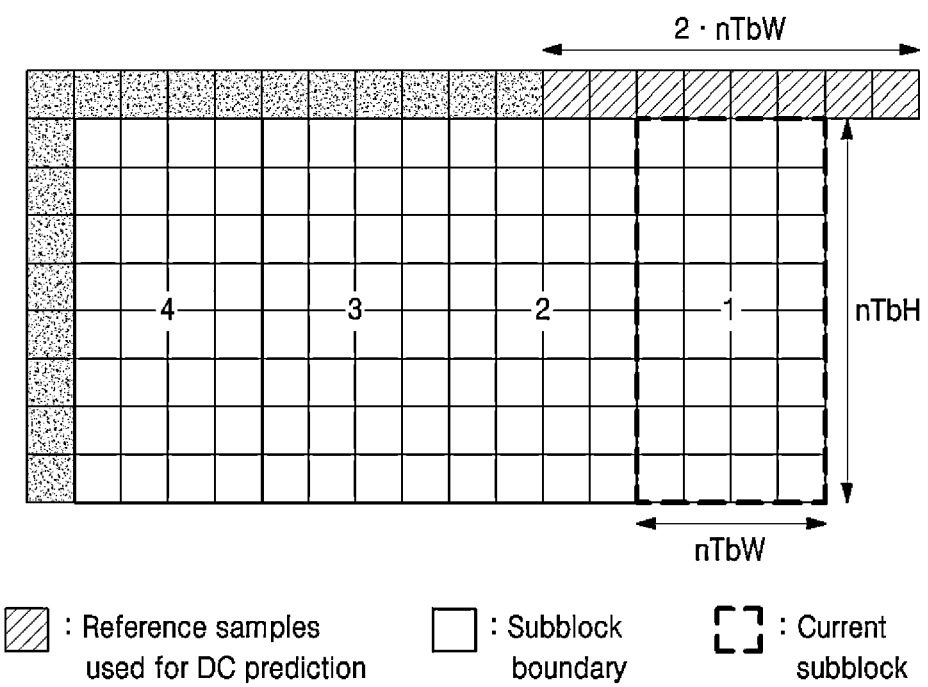

As another example, for the rightmost subblock, a DC value (DCVal) may be calculated, as expressed in Equation 3. At this time, the position of the reference samples utilized for the prediction is at the top, as illustrated in FIG. 19B.

$$DCVal = \left( \sum_{x'=0}^{2 \cdot nTBW-1} p[x' - (nTbW \gg 1)][-1] + nTbW \right) \gg \qquad \text{[Equation 3]}$$

$$(\log_2 nTbW + 1)$$

Here, if the reference samples of p[nTbW][−1], . . . , p[1.5·nTbW−1][−1] are not available for use, the above reference samples may be generated by copying the reference sample of p[nTbW−1][−1].

Figure 20:
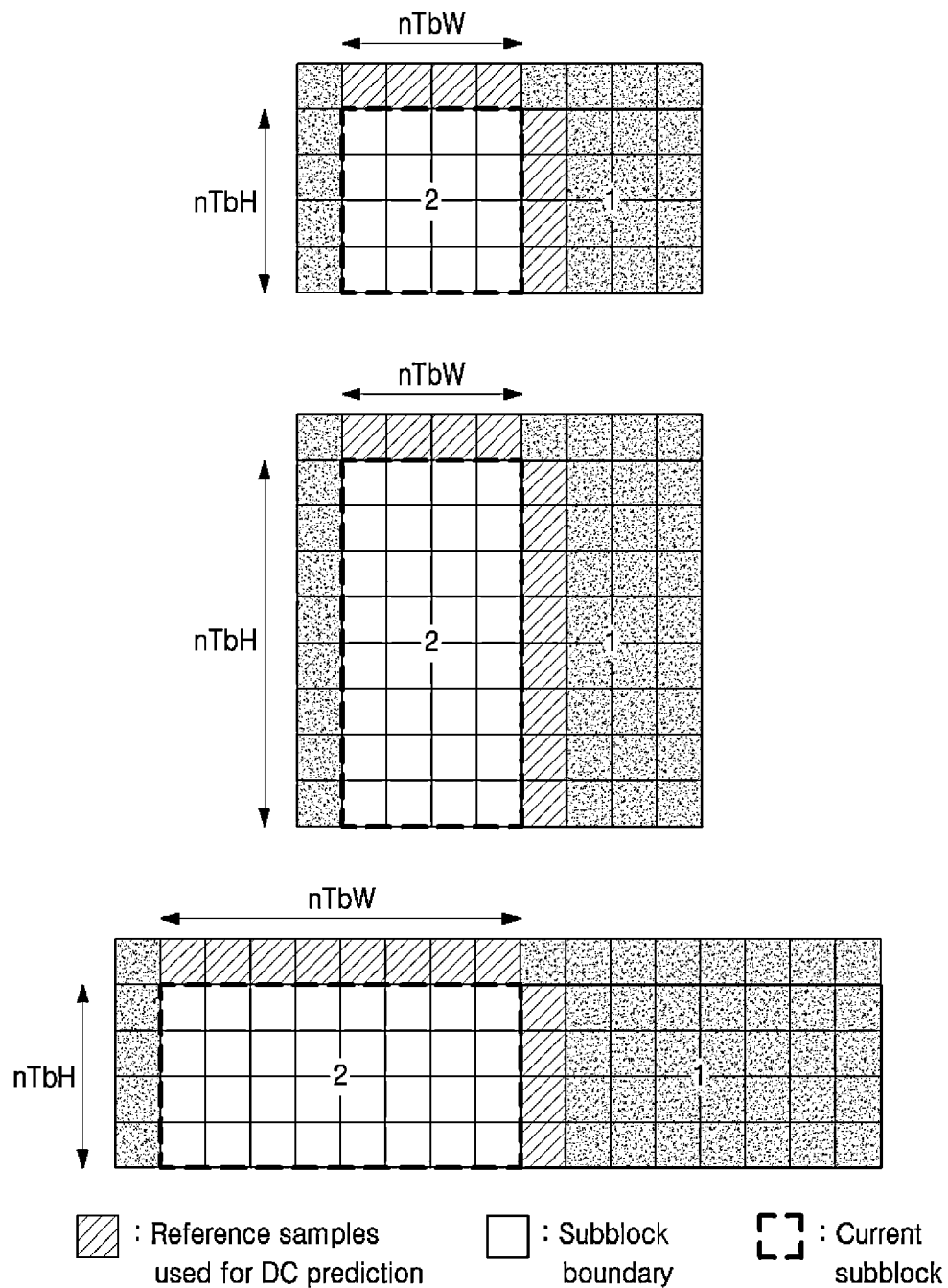
FIG. 20 is a diagram illustrating reference samples utilized for DC prediction, according to another embodiment of the present disclosure.

Meanwhile, for the remaining subblocks except the rightmost subblock, based on the nTbW and nTbH of the subblock, the DCVal may be calculated as expressed in Equation 4 to Equation 6. At this time, the positions of the reference samples utilized for prediction are top and left, as illustrated in FIG. 20.

if (nTbW == nTbH) [Equation 4]

$$DCVal = \left( \sum_{x'=0}^{nTbW-1} p[x'][-1] + \sum_{y'=0}^{nTbH-1} p[nTbW][y'] + nTbW \right) \gg$$

$$(\log_2(nTbW) + 1)$$

if (nTbW > nTbH) [Equation 5]

$$DC_U = \left( \sum_{x'=0}^{nTbW-1} p[x'][-1] + (nTbW \gg 1) \right) \gg (\log_2 nTbW)$$

$$DC_R = \left( \sum_{y'=0}^{nTbH-1} p[nTbW][y'] + (nTbH \gg 1) \right) \gg (\log_2 nTbH)$$

$$DCVal = (DC_U + DC_R + 1) \gg 1$$

if (nTbW < nTbH) [Equation 6]

$$DCVal = \left( \sum_{y'=0}^{nTbH-1} p[nTbW][y'] + (nTbH \gg 1) \right) \gg (\log_2 nTbH)$$

As another example, if 'nTbW>nTbH', the DCVal may be calculated by using the top or right reference samples, as expressed in Equation 7 or Equation 8, in place of Equation 5.

$$\text{DCVal} = (\Sigma_{x'=0}^{nTbW-1} p[x'][-1] + (nTbW >> 1)) >> (\log_2 nTbW) \qquad \text{[Equation 7]}$$

$$\text{DCVal} = (\Sigma_{y'=0}^{nTbH-1} p[nTbW][y'] + (nTbH >> 1)) >> (\log_2 nTbH) \qquad \text{[Equation 8]}$$

Further, if 'nTbW<nTbH', the DCVal may be calculated by using the top reference samples, as expressed in Equation 7, in place of Equation 6.

In addition, according to embodiments, if 'nTbW<nTbH' as with the case that 'nTbW>nTbH', the DCVal may be calculated by using the top and right reference samples of the current subblock.

The following describes the case where the reconstruction order is VH_hor_order1.

Figure 21A:
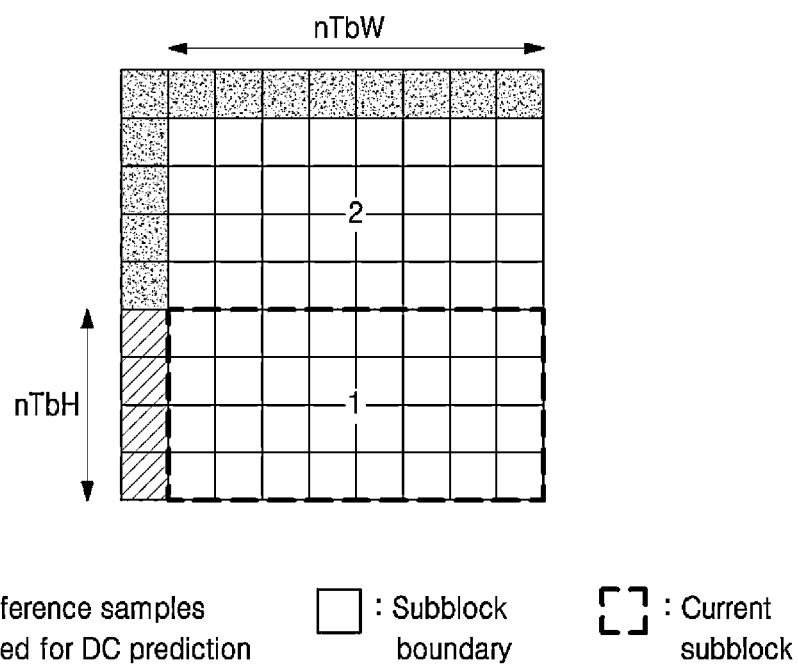
FIGS. 21A and 21B are diagrams illustrating reference samples utilized for DC prediction, according to yet another embodiment of the present disclosure.

The bottom subblock, which is reconstructed first, may be intra-predicted by using the DC mode, as expressed in Equation 9 and Equation 2. At this time, the position of the reference samples utilized for prediction is to the left, as illustrated in FIG. 21A.

$$\text{DCVal} = (\Sigma_{y'=0}^{nTbH-1} p[-1][y'] + (nTbH >> 1)) >> \log_2 nTbH$$

As another example, for the bottom subblock, the DCVal may be calculated, as expressed in Equation 10. At this time, the position of the reference samples utilized for the prediction is to the left, as illustrated in FIG. 21A.

$$DCVal = \left( \sum_{y'=0}^{2 \cdot nTBH-1} p[-1][y' - (nTbH \gg 1)] + nTbH \right) \gg \qquad \text{[Equation 10]}$$

$$(\log_2(nTbH) + 1)$$

Figure 21B:
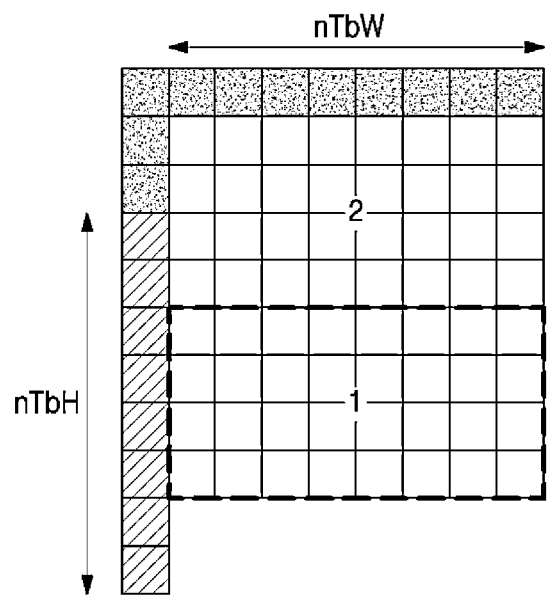

The positions of the reference samples utilized in the prediction are illustrated in FIG. 21B. Where the reference samples of p[−1][nTbH], . . . , p[−1][1.5 nTbH−1] are not available for use, the above reference samples may be generated by copying the reference sample of p[−1][nTbH−1].

Figure 22:
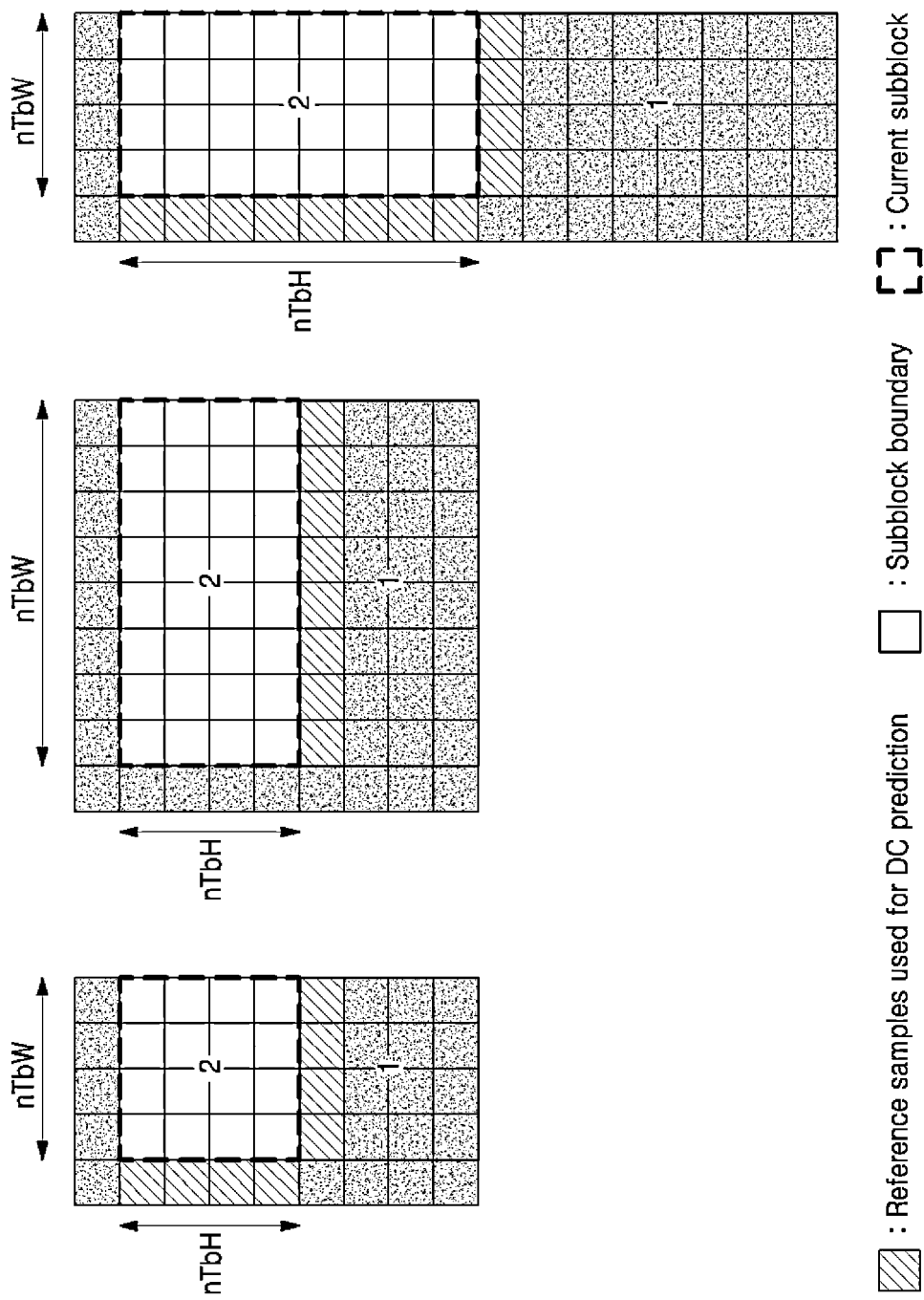
FIG. 22 is a diagram illustrating reference samples utilized for DC prediction, according to yet another embodiment of the present disclosure.

Meanwhile, for the remaining subblocks except the bottom subblock, based on the nTbW and nTbH of the subblock, the DCVal may be calculated as expressed in Equation 11 to Equation 13. At this time, the positions of the reference samples utilized for prediction are left and bottom, as illustrated in FIG. 22.

if (nTbW == nTbH) [Equation 11]

$$DCVal = \left( \sum_{x'=0}^{nTbW-1} p[x'][-1] + \sum_{y'=0}^{nTbH-1} p[nTbW][y'] + nTbW \right) \gg$$

$$(\log_2(nTbW) + 1)$$

if (nTbW > nTbH) [Equation 12]

$$DCVal = \left( \sum_{x'=0}^{nTbW-1} p[x'][nTbH] + (nTbW \gg 1) \right) \gg (\log_2 nTbW)$$

if (nTbW < nTbH) [Equation 13]

$$DC_B = \left( \sum_{x'=0}^{nTbW-1} p[x'][nTbH] + (nTbW \gg 1) \right) \gg (\log_2 nTbW)$$

$$DC_L = \left( \sum_{y'=0}^{nTbH-1} p[-1][y'] + (nTbH \gg 1) \right) \gg (\log_2 nTbH)$$

$$DCVal = (DC_B + DC_L + 1) \gg 1$$

As another example, if 'nTbW>nTbH', the DCVal may be calculated by using the left reference samples, as expressed in Equation 14, in place of Equation 12.

$$\text{DCVal} = (\Sigma_{y'=0}^{nTbH-1} p[-1][y'] + (nTbH >> 1)) >> (\log_2 nTbH) \qquad \text{[Equation 14]}$$

Additionally, if 'nTbW<nTbH', the DCVal may be calculated by using the left or bottom reference samples, as expressed in Equation 14 or Equation 15, in place of Equation 13.

$$DCVal=(\Sigma_{x'=0}^{nTbW-1} p[x'][nTbH]+(nTbW>>1))>>$$
$$(\log_2 nTbW)  \quad \text{[Equation 15]}$$

In addition, according to embodiments, if 'nTbW>nTbH' as with the case that 'nTbW<nTbH', the DCVal may be calculated by using the left and bottom reference samples of the current subblock.

Figure 23:
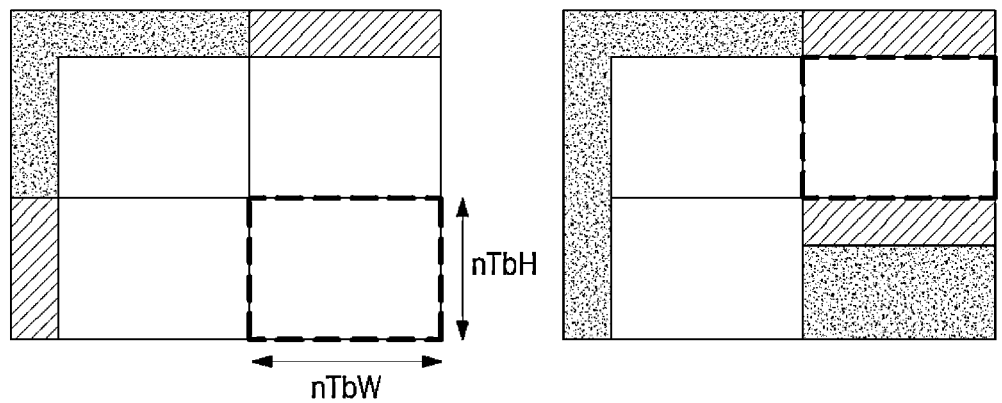
FIG. 23 is a diagram illustrating reference samples utilized for DC prediction, according to yet another embodiment of the present disclosure.

The following describes a method of intra-predicting each subblock by using the DC mode for the quadtree partitioning mode. The following embodiment assumes a case of partitioning in the quadtree partitioning mode and reconstructing performed in the order illustrated in FIG. 9A or FIG. 9B. In this case, each subblock may be intra-predicted according to the DC mode by using the reference samples illustrated in FIG. 23.

For the bottom right subblock, which is the first to be reconstructed, DCVal may be calculated by using the top and left reference samples. By averaging the top and left reference samples, respectively, $DC_U$ and $DC_L$ may be calculated, and then DCVal may be calculated, as expressed in Equation 16.

$$DCVal=(u \cdot DC_U + v \cdot DC_L)/(u+v) \quad \text{[Equation 16]}$$

Here, the weights u and v may always be 1. Alternatively, the weights may be calculated based on the number of top and left reference samples.

On the other hand, if 'nTbW!=nTbH', then DCVal may be calculated as follows. If 'nTbW>nTbH', DCVal may be determined as $DCVal=DC_U$. On the other hand, if 'nTbH>nTbW', DCVal may be determined as $DCVal=DC_L$.

For the top right subblock, DCVal may be calculated by weighted averaging the average $DC_U$ of the top reference samples and the average $DC_B$ of the bottom reference samples. Additionally, for the bottom left subblock, the DCVal may be calculated by weighted averaging the average $DC_L$ of the left reference samples and the average $DC_R$ of the right reference samples. For the top right subblock, the average $DC_B$ of the bottom reference samples may be determined as the DCVal. Additionally, for the bottom left subblock, the average $DC_R$ of the right reference samples may be determined as the DCVal.

For the top left subblock, which is the last to be reconstructed, $DC_U$, $DC_B$, $DC_L$, and $DC_R$ may be calculated by averaging the top, bottom, left, and right reference samples, respectively, and then DCVal may be calculated, as expressed in Equation 17.

$$DCVal=(u \cdot DC_U + u \cdot DC_B + v \cdot DC_L + v \cdot DC_R)/2(u+v) \quad \text{[Equation 17]}$$

Here, the weights u and v may always be 1. Alternatively, the weights u and v may be calculated based on the number of reference samples on the top, bottom, left, and right.

The following describes a method of intra-predicting each subblock by using a matrix-based prediction mode.

Figure 24:
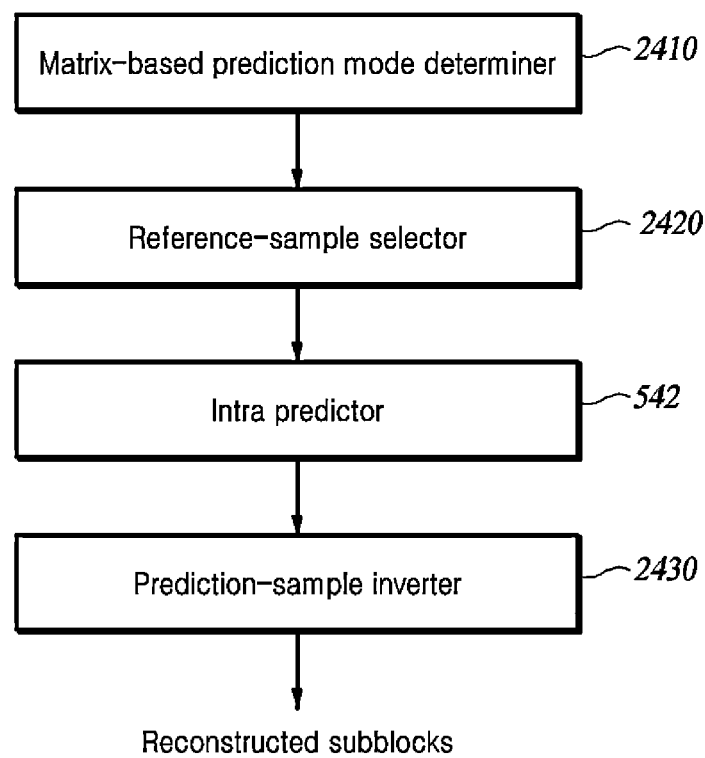
FIG. 24 is a block diagram of a video decoding apparatus for decoding subblocks, according to yet another embodiment of the present disclosure.

FIG. 24 is a block diagram of a video decoding apparatus for decoding subblocks, according to yet another embodiment of the present disclosure.

To perform subblock-by-subblock intra prediction according to the matrix-based prediction mode, the video decoding apparatus may further include the intra predictor 542 a matrix-based prediction mode determiner 2410, a reference-sample selector 2420, and a prediction-sample inverter 2430.

The matrix-based prediction mode determiner 2410 determines the matrix-based prediction mode of the current block by parsing the matrix-based prediction mode.

The reference-sample selector 2420 may utilize available neighboring reference samples of the current subblock to perform the matrix-based prediction. Alternatively, the reference-sample selector 2420 may downsample or subsample the neighboring reference samples to generate reference samples (redRef) of size redH+redW.

Figure 25:
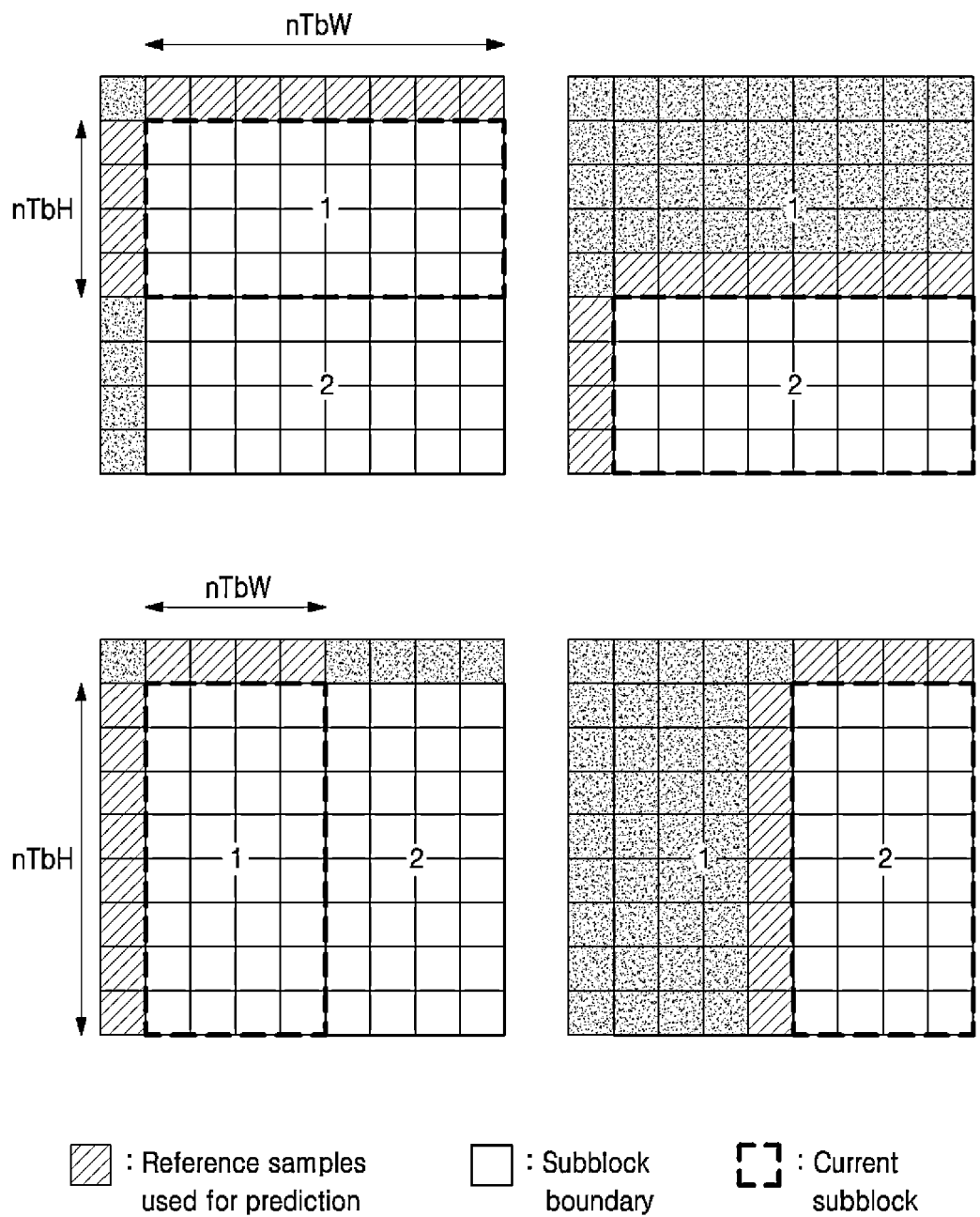
FIG. 25 is a diagram illustrating reference samples utilized for matrix-based prediction, according to at least one embodiment of the present disclosure.

When the reconstruction order of the subblocks is VH_hor_order0 or VH_ver_order0, the reference samples to be used for prediction may be generated by using the left and top reference samples of the current subblock, as shown in the example of FIG. 25.

Figure 26:
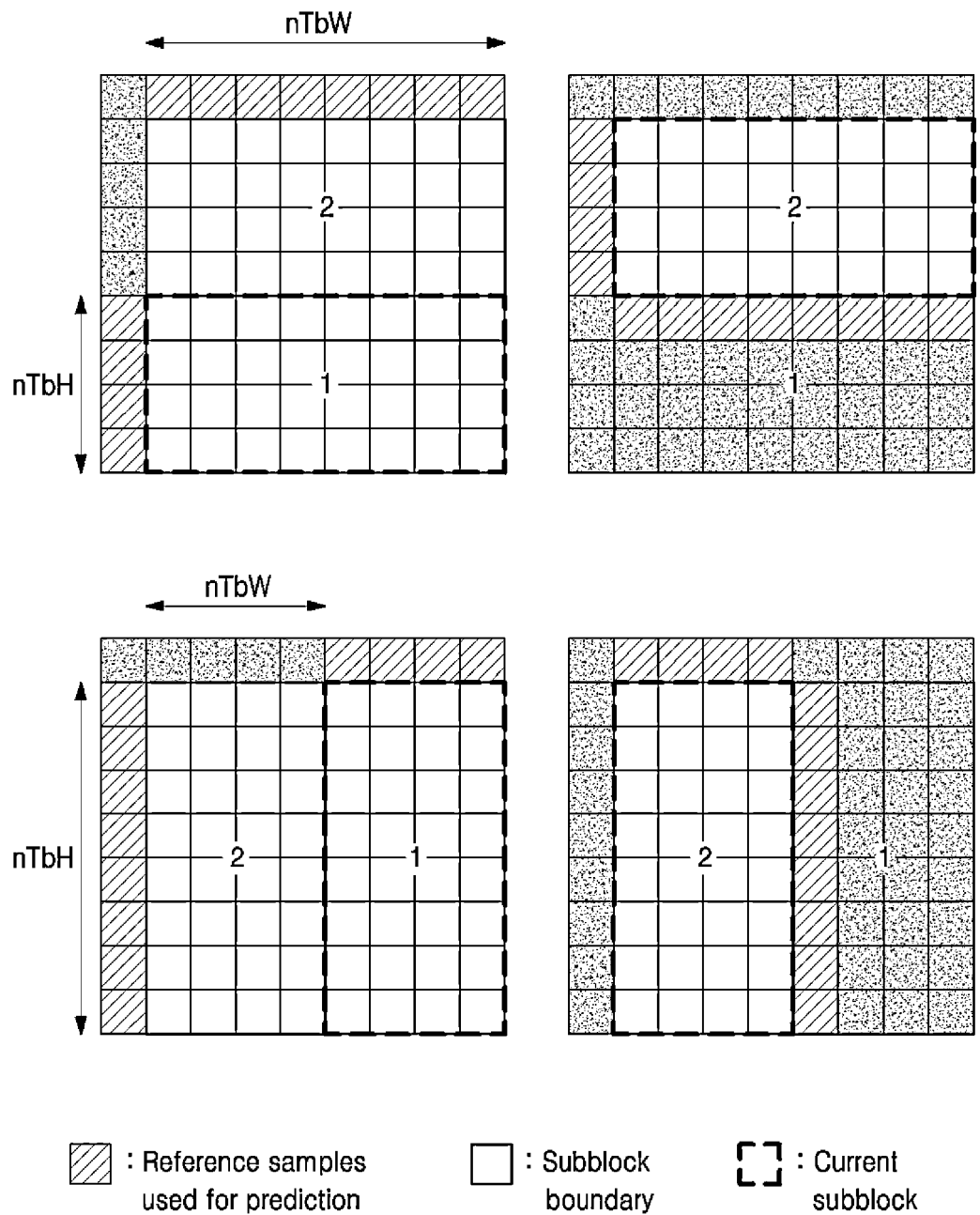
FIG. 26 is a diagram illustrating reference samples utilized for matrix-based prediction, according to another embodiment of the present disclosure.

Further, when the reconstruction order of the subblocks is VH_hor_order1 or VH_ver_order1, the reference samples to be used for prediction may be generated by using the neighboring reference samples of the current subblock, as shown in the example of FIG. 26.

Meanwhile, the subblock that is reconstructed first may be predicted by using a specified mode according to an agreement between the video encoding apparatus and the video decoding apparatus. Here, the specified mode may be DC, planar, vertical mode, horizontal mode, or the like.

Figure 27:
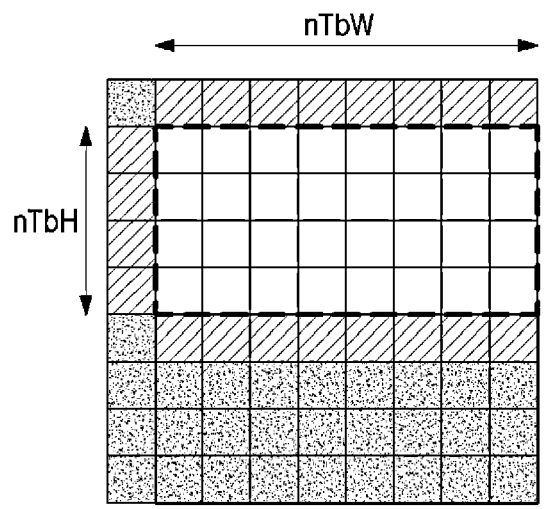
FIG. 27 is a diagram illustrating reference samples utilized for matrix-based prediction, according to yet another embodiment of the present disclosure.
Figure 27:
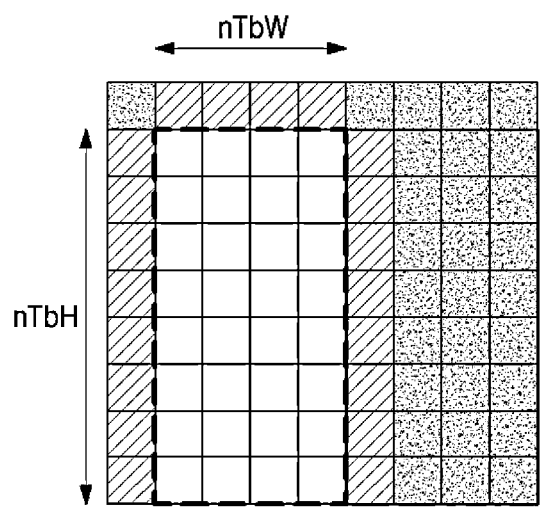

As another example, when the reconstruction order is VH_hor_order1 or VH_ver_order1, for the remaining subblocks except for the bottom block (in VH_hor_order1) or the rightmost subblock (in VH_ver_order1) that is reconstructed first, reference samples to be used for prediction may be generated by using the reference samples as illustrated in FIG. 27.

In VH_hor_order1 as the reconstruction order, the present embodiment may use the top, bottom, and left reconstruction samples. Alternatively, subsampling or downsampling may be performed to generate $redW_{up}$, $redW_{down}$, and redH, which may then be utilized for matrix-based prediction. At this time, the sizes of $redW_{up}$, $redW_{down}$, and redH may be implicitly determined based on nTbW and nTbH.

In VH_ver_order1 as the reconstruction order, the present embodiment may use the left, right, and top reconstruction samples. Alternatively, subsampling or downsampling may be performed to generate $redH_{left}$, $redH_{right}$, and redW, which may then be utilized for matrix-based prediction. At this time, the sizes of $redH_{left}$, $redH_{Right}$, and redW may be implicitly determined based on nTbH and nTbW.

Figure 28:
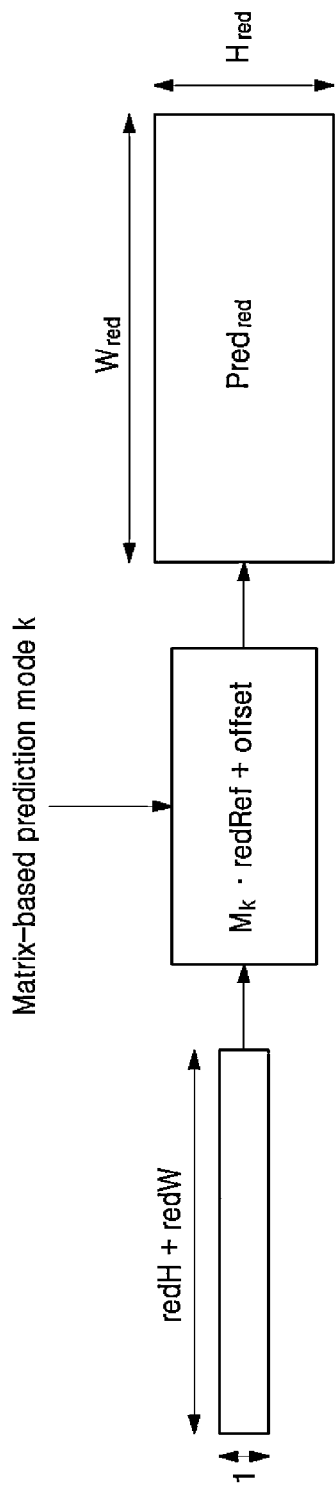
FIG. 28 is a diagram illustrating a matrix-based prediction, according to at least one embodiment of the present disclosure.

FIG. 28 is a diagram illustrating a matrix-based prediction, according to at least one embodiment of the present disclosure.

The intra prediction unit 542 performs the matrix-based prediction for each subblock by using the reference samples. The intra prediction unit 542 performs matrix multiplication on a matrix according to the parsed mode and a reference sample vector of size redH+redW, as illustrated in FIG. 28. Further, by adding the offset values agreed upon by the mode or the offset values calculated from the reference samples, a set of predicted signals of size $W_{red} \times H_{red}$ may be generated. In the example of FIG. 28, $Pred_{red}$ represents the matrix-based predicted prediction samples. On the other hand, when the reference samples are used as illustrated in FIG. 27, the reference sample vector has the size of $redW_{up}+redW_{down}+redH$ for the reconstruction order of VH_hor_order1, and the reference sample vector has the size of $redH_{left}+redH_{right}+redW$ for the reconstruction order of VH_ver_order1.

As one example, redH=nTbH and redW=nTbW. Alternatively, each of redH and redW may be determined to be an integer value less than nTbH and nTbW based on the size of the subblock, according to an agreement between the video encoding apparatus and the video decoding apparatus.

As another example where using the reference samples illustrated in FIG. 27, $redW_{up}=redW_{down}=nTbW$ and redH=nTbH for the reconstruction order of VH_hor_order1. Alternatively, each of redH and redW may be determined to be an integer value less than nTbH and nTbW based on the size of the subblock, according to an agreement between the video encoding apparatus and the video decoding apparatus. At this time, the matrix utilized for prediction has a size of $(redW_{up}+redW_{down}+redH) \times (W_{red} \times H_{red})$.

Further, for a reconstruction order that is VH_ver_order1, $redH_{left}=redH_{right}=nTbH$ and redW=nTbW. Alternatively, each of redH and redW may be determined to be an integer value less than nTbH and nTbW based on the size of the subblock, according to an agreement between the video encoding apparatus and the video decoding apparatus. At this time, the matrix utilized for prediction has a size of $(redH_{left}+redH_{right}+redW) \times (W_{red} \times H_{red})$.

In one example, $W_{red}=nTbW$ and $H_{red}=nTbH$. Alternatively, each of $H_{red}$ and $W_{red}$ may be determined to be integer values less than nTbH and nTbW based on the size of the subblock, according to an agreement between the video encoding apparatus and the video decoding apparatus.

The matrix $M_k$ used for matrix-based prediction may be defined based on an agreement between the video encoding apparatus and the video decoding apparatus. Additionally, the matrix may be determined by parsing from a high level, such as sequence, picture, adaptation parameter set (APS), and the like. When parsed from the high level, the low level, such as picture, slice, and the like, may selectively use the parsed matrix from the high level to perform the prediction.

Figure 29A:
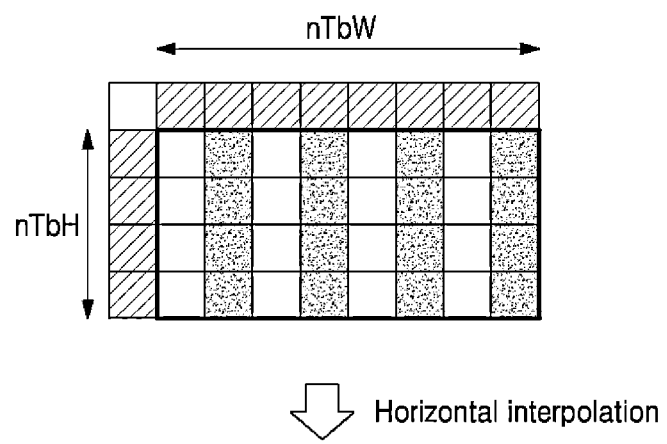
FIGS. 29A and 29B are diagrams illustrating interpolations during matrix-based prediction, according to at least one embodiment of the present disclosure.
Figure 29A:
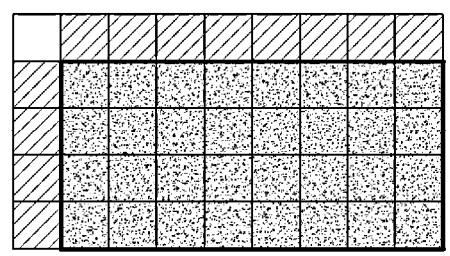
Figure 29B:
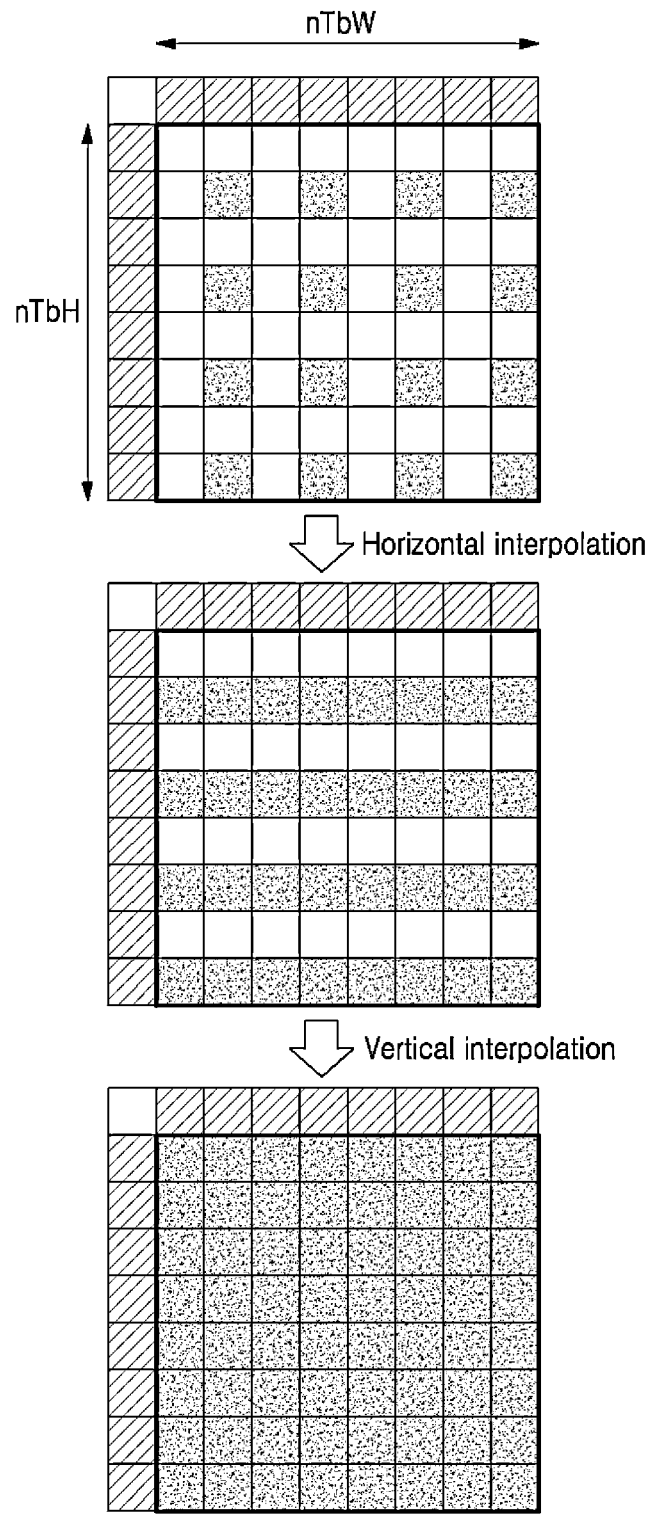

If $W_{red}$<nTbW and/or $H_{red}$<nTbH, additional interpolation may be performed to make the size of the prediction samples nTbW×nTbH. For example, linear interpolation may be performed in the horizontal and vertical directions by using the reference samples, the downsampled reference samples, or the subsampled reference samples and the predicted samples of $Pred_{red}$. As one example, a horizontal interpolation embodiment of a subblock with nTbW=8, nTbH=4, $W_{red}$=4, and $H_{red}$=4 is illustrated in FIG. 29A. As another example, a horizontal interpolation embodiment of a subblock with nTbW=8, nTbH=8, $W_{red}$=4, and $H_{red}$=4 is illustrated in FIG. 29B.

In one example, when the left and bottom reference samples are used, matrix-based prediction may be performed by using the same matrix as when the left and top reference samples are used. At this time, the bottom reference samples may be copied to the top reference samples, and then interpolation may be performed by using the left and copied top reference samples. As another example, when the top and right reference samples are used, matrix-based prediction may be performed by using the same matrix as when the top and left reference samples are used. At this time, the right reference samples may be copied to the left reference samples, and interpolation may be performed by using the top and copied left reference samples.

Figure 30A:
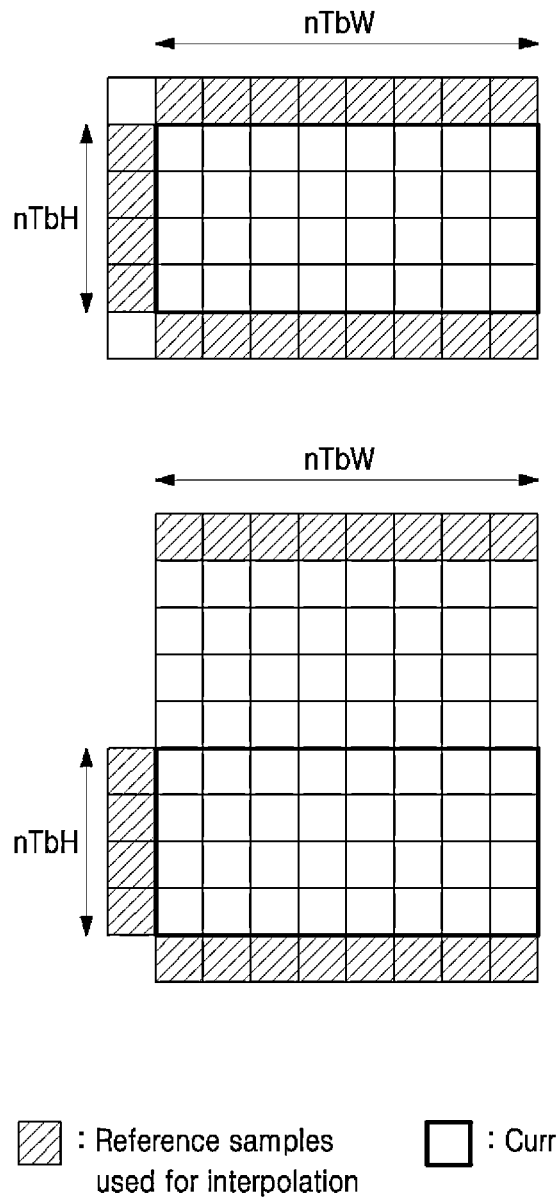
FIGS. 30A and 30B are diagrams illustrating interpolations during matrix-based prediction, according to other embodiments of the present disclosure.
Figure 30B:
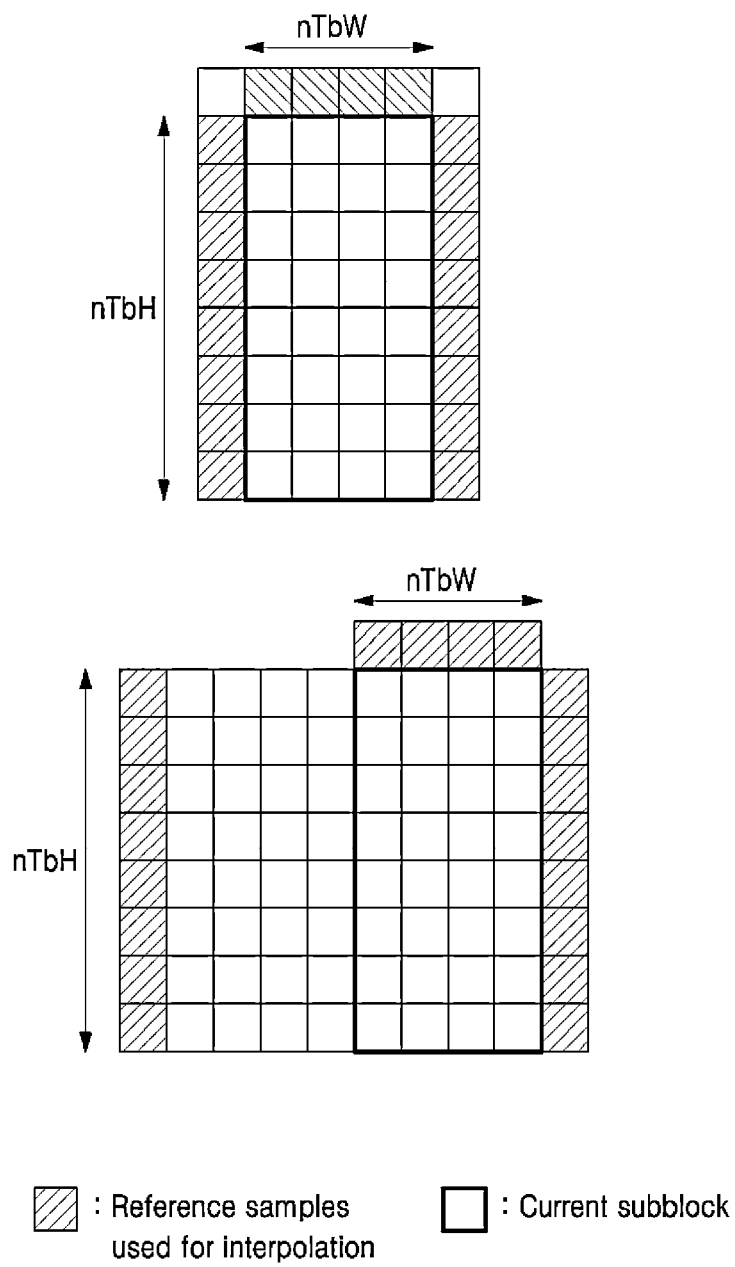

On the other hand, for the reconstruction order that is VH_hor_order1, interpolation in the horizontal and/or vertical directions may be performed by using the previously reconstructed top, bottom, and left reference samples, as illustrated in FIG. 30A. Further, for the reconstruction order that is VH_ver_order1, interpolation in the horizontal and/or vertical directions may be performed by using the previously reconstructed left, right, and top reference samples, as illustrated in FIG. 30B.

Additionally, when interpolation is performed, linear interpolation may be performed based on the distance between the reference samples used for interpolation and the interpolation location.

Figure 31:
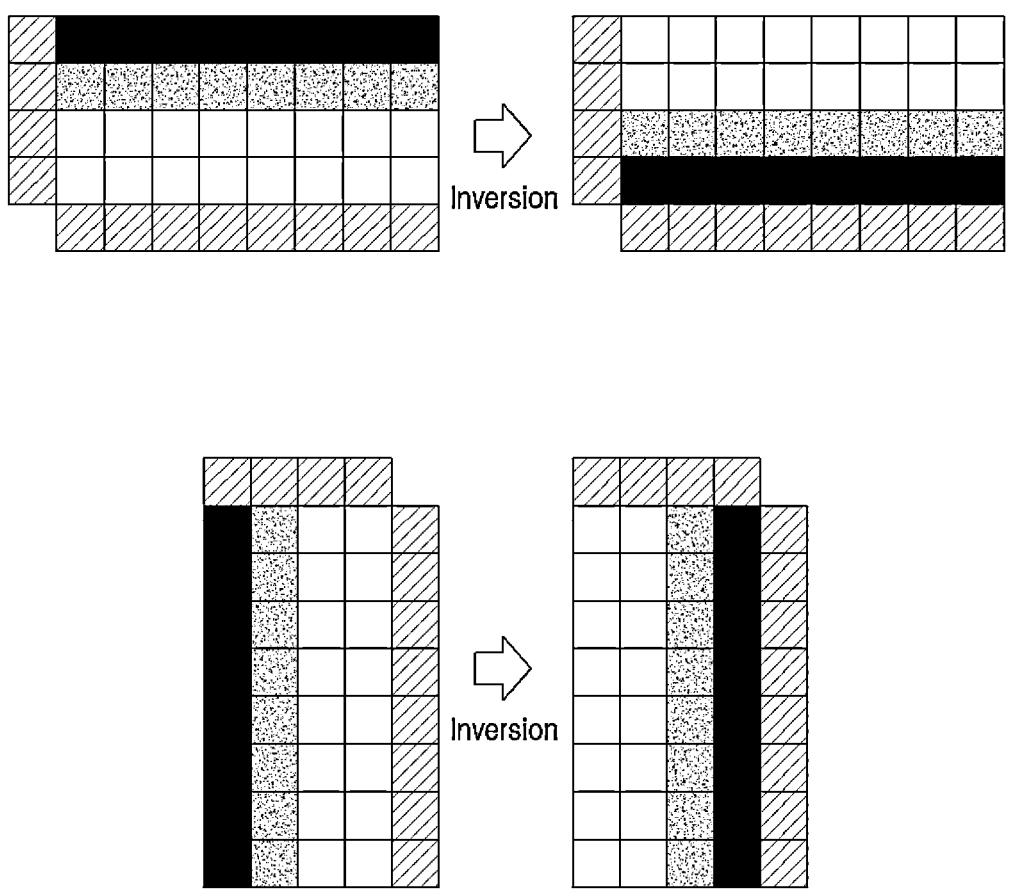
FIG. 31 is an illustration of inversions of prediction samples, according to at least one embodiment of the present disclosure.

The prediction-sample inverter 2430 may be responsive to when matrix-based prediction is performed by using the left and bottom (or top and right) reference samples based on a matrix trained to utilize the left and top reference samples, for inverting the matrix-based predicted prediction samples to generate the final prediction samples, as shown in the illustration of FIG. 31.

The following describes a method of intra-predicting each subblock by using PDPC mode.

Figure 32A:
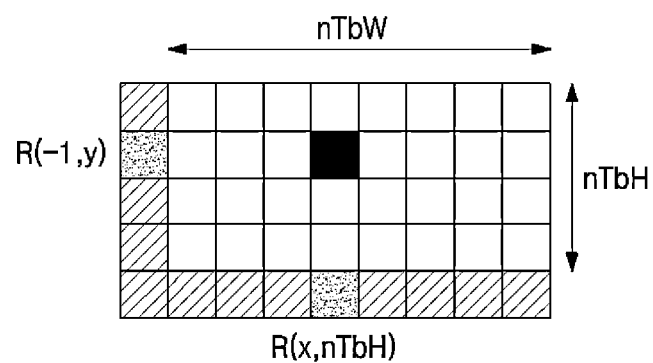
FIGS. 32A and 32B are diagrams illustrating the generation of prediction samples based on Position Dependent intra Prediction Combination (PDPC) mode, according to at least one embodiment of the present disclosure.
Figure 32A:
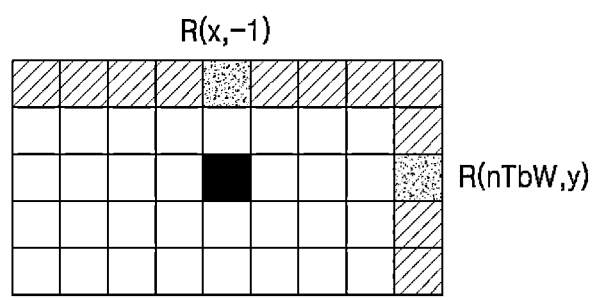
Figure 32B:
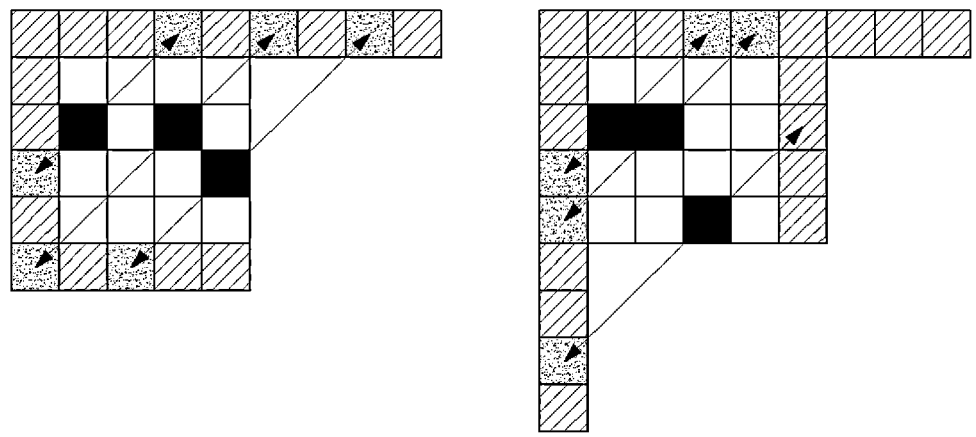

If the bottom reference samples or the right reference samples have already been reconstructed due to a change in the reconstruction order of the subblocks, the present embodiment may weighted-sum the already predicted signal pred(x,y) according to the intra-prediction mode, and the locations of the reference samples illustrated in FIGS. 32A and 32B to generate a final prediction sample. For non-directional modes (DC, planar, and the like) as illustrated in FIG. 32A, the final prediction sample may be calculated according to Equation 18.

$$pred_f(x,y)=u \cdot R(-1,y)+u \cdot R(x,nTbH)+(1-u-v) \cdot pred(x,y) \quad \text{[Equation 18]}$$

In this case, when the prediction is made by using the left and bottom reference samples, weight u may be determined to be proportional to the x-axis distance between pred(x,y) and R(-1,y), and weight v may be determined proportionally to the y-axis distance between pred(x,y) and R(x,nTbH). Additionally, when the prediction is made by using the top and right reference samples, weight u may be determined proportionally to the x-axis distance between pred(x,y) and R(nTbW,y), and weight v may be determined proportionally to the y-axis distance between pred(x,y) and R(x,-1).

For directional modes, when the prediction is made by using the left and bottom reference samples, the present embodiment may weighted-sum the top reference sample and the left (or bottom) reference sample in the relevant prediction directions from position (x,y) to generate a final prediction sample, as illustrated in FIG. 32B. When the prediction is made by using the top and right reference samples, the present embodiment may weighted-sum the left reference sample and the top (or right) reference sample in the relevant prediction directions from position (x,y) to generate a final prediction sample.

The following describes a method of restricting PU (Prediction Unit) partitioning based on the intra-prediction mode during subblock partitioning.

Figure 33:
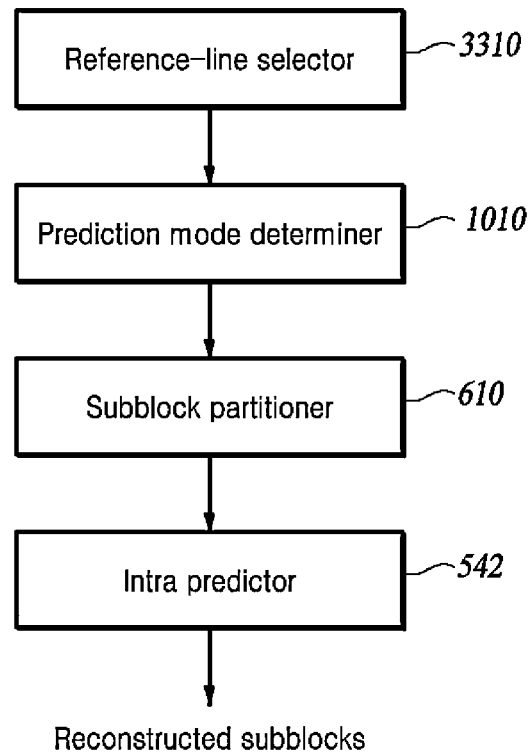
FIG. 33 is a block diagram of a video decoding apparatus for decoding subblocks, according to yet another embodiment of the present disclosure.

FIG. 33 is a block diagram of a video decoding apparatus for decoding subblocks, according to yet another embodiment of the present disclosure.

To limit PU partitioning, the video decoding apparatus may further include a reference-line selector 3310 to the subblock partitioner 610, the intra predictor 542, and the prediction mode determiner 1010.

The reference-line selector 3310 parses ml_idx to determine the position of a reference sample line to be used for intra prediction. Here, mrl_idx may be an index of one of 0, 1, ..., n−1, and the (mrl_idx+1)st neighboring reference sample line from the current block is utilized for intra prediction.

The prediction mode determiner 1010 determines the intra-prediction mode of the current block as described above. For example, when mrl_idx=0 (using the closest reference sample line from the current block), the prediction mode determiner 1010 may parse the MPM_flag to determine whether to use MPM. On the other hand, when mrl_idx!=0, parsing of MPM_flag may be omitted, and prediction mode determiner 1010 may parse mpm_idx to determine intra-prediction mode by always using MPM.

The subblock partitioner 610 determines whether and how to partition the current block into subblocks based on the intra-prediction mode, and the subblock partitioner 610 partitions the current block into PU and TU (Transform Unit).

The subblock partitioner 610 is responsive to when the TU and PU are parsed at once, for determining whether to partition the subblock by parsing the subblock split flag. When the subblock split flag is 1, the subblock partitioner 610 partitions the current block into subblocks as described above.

Figure 34:
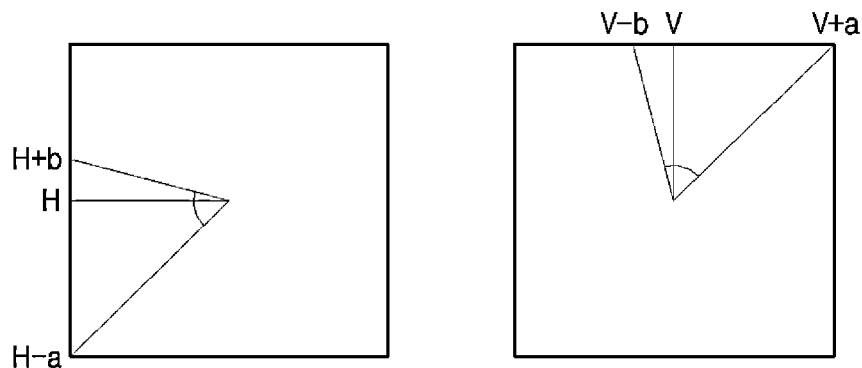
FIG. 34 is a diagram illustrating directional modes, according to at least one embodiment of the present disclosure.

When the subblock split flag is 1 and the parsed directional mode M of the current block is a mode (H−a≤M≤H+b) such as in the example in FIG. 34, the subblock partitioner 610 may implicitly determine the partitioning direction of the subblocks as a vertical subblock partitioning mode, i.e., the current block is not partitioned in the horizontal direction. In one example, H−a may be a diagonally oriented mode from the top-right to bottom-left, and b=0.

Furthermore, when the subblock split flag is 1 and the parsed directional mode (M) of the current block is a mode (V−b≤M≤V+a) such as in the example in FIG. 34, the direction of the subblocks may be implicitly determined to be a horizontal subblock partitioning mode, i.e., the current block is not split in the vertical direction. For example, V+a may be a diagonally oriented mode from bottom-left to top-right, and b=0.

Meanwhile, the subblock partitioner 610 is responsive to when the TU and PU are parsed separately, for determining whether to partition the TU and PU by parsing the subblock split flag.

When the subblock split flag is 1 and the parsed directional mode M of the current block is a mode (H−a≤M≤H+b) such as in the example in FIG. 34, the subblock partitioner 610 may implicitly determine the partitioning direction of the PU or the partitioning direction of the PU/TU to be a vertical subblock partitioning mode.

When the subblock split flag is 1 and the parsed directional mode M of the current block is a mode (V−b≤M≤V+a) such as in the example in FIG. 34, the subblock partitioner 610 may implicitly determine the partitioning direction of the PU or the partitioning direction of the PU/TU to be a horizontal subblock partitioning mode.

Parsing, entropy decoding, inverse quantization, and inverse transform of the residual signals are performed for each subblock TU, and the intra prediction unit 542 determines the position of the reference samples for the PU and then performs intra prediction.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

122: intra predictor
542: intra predictor
610: subblock partitioner
620: subblock coding-order determiner
630: subblock reconstructor
1010: prediction mode determiner

What is claimed is:

1. A method performed by a video decoding apparatus for decoding subblocks partitioned from a current block, which is a coding unit (CU) partitioned from a coding tree unit (CTU), the method comprising:
    decoding, from a bitstream, an intra-prediction mode of the current block, a partitioning mode of the subblocks, and a coding order flag, wherein the partitioning mode is a Quadtree (QT) partitioning mode, in which the current block is partitioned into four square subblocks, or a Vertical and Horizontal (VH) partitioning mode, in which the current block is partitioned into multiple parallel rectangular subblocks;
    partitioning the current block into the subblocks according to the partitioning mode;
    determining a coding order for the subblocks based on the coding order flag, wherein the coding order for the subblocks is selected based on the coding order flag from either a first coding order or a second coding order, which is reverse of the first coding order; and
    reconstructing the subblocks sequentially in the coding order based on the intra-prediction mode of the current block,
    wherein reconstructing the subblocks sequentially comprises:
        determining, for a current subblock to be currently reconstructed among the subblocks, an intra-prediction mode of the current subblock based on the intra-prediction mode of the current block;
        predicting the current subblock based on the intra-prediction mode of the current subblock to generate prediction samples for the current subblock; and
        reconstructing the current subblock based on the prediction samples for the current subblock, wherein reconstructed samples of the current subblock are used as a reference sample for intra prediction of subblocks that follow the current subblock in the coding order.

2. The method of claim 1, wherein partitioning the current block comprises:
when the partitioning mode is the VH partitioning mode, decoding a flag indicating a partitioning direction from the bitstream, and partitioning the current block in a horizontal direction or a vertical direction based on the flag indicating the partitioning direction.

3. The method of claim 2, wherein determining the coding order comprises:
when the coding order flag is false, determining, for subblocks partitioned in the horizontal direction according to the VH partitioning mode, a coding order starting from a top subblock and ending at a bottom subblock;
when the coding order flag is false, determining, for subblocks partitioned in the vertical direction according to the VH partitioning mode, a coding order starting from a leftmost subblock and ending at a rightmost subblock;
when the coding order flag is true, determining, for the subblocks partitioned in the horizontal direction according to the VH partitioning mode, a coding order starting from the bottom subblock and ending at the top subblock; and
when the coding order flag is true, determining, for the subblocks partitioned in the vertical direction according to the VH partitioning mode, a coding order starting from the rightmost subblock and ending at the leftmost subblock.

4. The method of claim 1, wherein determining the coding order comprises:
when the coding order flag is false, determining, for subblocks partitioned according to the QT partitioning mode, a coding order starting from a top left subblock and ending at a bottom right subblock; and
when the coding order flag is true, determining, for the subblocks partitioned according to the QT partitioning mode, a coding order starting from the bottom right subblock and ending at the top left subblock.

5. The method of claim 4, wherein determining the intra-prediction mode of the current subblock comprises:
when the coding order flag is true, and when the current subblock is the bottom right subblock among subblocks partitioned according to the QT partitioning mode, then setting the intra-prediction mode of the current subblock to a preset prediction mode, which differs from the intra-prediction mode of the current block; and
when the coding order flag is true, and when the current subblock is the top left subblock, a top right subblock, or a bottom left subblock among subblocks partitioned according to the QT partitioning mode, then setting the intra-prediction mode of the current subblock to the same value as the intra-prediction mode of the current block.

6. The method of claim 5,
wherein the bottom right subblock is predicted from top and left reconstructed neighboring samples adjacent to the current block in the preset prediction mode.

7. The method of claim 4, wherein,
when the intra-prediction mode of the current block is bilinear interpolation-based prediction, when the coding order flag is true, and when the current subblock is the bottom right subblock among subblocks partitioned according to the QT partitioning mode, then the prediction samples of the current subblock are generated by using the bilinear interpolation-based prediction based on top and left reconstructed neighboring samples adjacent to the current block, and
when the intra-prediction mode of the current block is the bilinear interpolation-based prediction, when the coding order flag is true, and when the current subblock is the top left subblock, a top right subblock, or a bottom left subblock among subblocks partitioned according to the QT partitioning mode, then the prediction samples of the current subblock are generated by using the bilinear interpolation-based prediction based on previously reconstructed samples around the current subblock.

8. The method of claim 4, wherein,
when the intra-prediction mode of the current block is a direct current (DC) mode, when the coding order flag is true, and when the current subblock is the bottom right subblock among subblocks partitioned according to the QT partitioning mode, then a DC value for the current subblock is calculated from top and left reconstructed neighboring samples adjacent to the current block, and
when the intra-prediction mode of the current block is the direct current (DC) mode, when the coding order flag is true, and when the current subblock is the top left subblock, a top right subblock, or a bottom left subblock among subblocks partitioned according to the QT partitioning mode, then a DC value for the current subblock is calculated from previously reconstructed samples around the current subblock.

9. A method performed by a video encoding apparatus for encoding subblocks partitioned from a current block, which is a coding unit (CU) partitioned from a coding tree unit (CTU), the method comprising:
determining an intra-prediction mode of the current block, a partitioning mode of the subblocks, and a coding order flag, wherein the partitioning mode is a Quadtree (QT) partitioning mode, in which the current block is partitioned into four square subblocks, or a Vertical and Horizontal (VH) partitioning mode, in which the current block is partitioned into multiple parallel rectangular subblocks;
partitioning the current block into the subblocks according to the partitioning mode;
determining a coding order for the subblocks based on the coding order flag, wherein the coding order for the subblocks is selected based on the coding order flag from either a first coding order or a second coding order, which is reverse of the first coding order;
encoding and reconstructing the subblocks sequentially in the coding order based on the intra-prediction mode; and
encoding the intra-prediction mode of the current block, the partitioning mode of the subblocks, and the coding order flag,
wherein encoding and reconstructing the subblocks sequentially comprises:
determining, for a current subblock to be currently reconstructed among the subblocks, an intra-prediction mode of the current subblock based on the intra-prediction mode of the current block;
predicting the current subblock based on the intra-prediction mode of the current subblock to generate prediction samples for the current subblock;

encoding the current subblock based on the prediction samples for the current subblock; and reconstructing the current subblock based on the prediction samples for the current subblock, wherein reconstructed samples of the current subblock are used as a reference sample for intra prediction of subblocks that follow the current subblock in the coding order.

10. A method for providing a video decoding apparatus with video data, the method comprising:

encoding the video data into a bitstream; and transmitting the bitstream to the video decoding device, wherein the encoding of the video data comprises:

determining an intra-prediction mode of a current block, which is a coding unit (CU) partitioned from a coding tree unit (CTU), a partitioning mode of the current block, and a coding order flag, wherein the partitioning mode is a Quadtree (QT) partitioning mode, in which the current block is partitioned into four square subblocks, or a Vertical and Horizontal (VH) partitioning mode, in which the current block is partitioned into multiple parallel rectangular subblocks;

partitioning the current block into the subblocks according to the partitioning mode;

determining a coding order for the subblocks based on the coding order flag, wherein the coding order for the subblocks is selected based on the coding order flag from either a first coding order or a second coding order, which is reverse of the first coding order;

encoding and reconstructing the subblocks sequentially in the coding order based on the intra-prediction mode; and encoding the intra-prediction mode of the current block, the partitioning mode of the subblocks, and the coding order flag, wherein encoding and reconstructing the subblocks sequentially comprises:

determining, for a current subblock to be currently reconstructed among the subblocks, an intra-prediction mode of the current subblock based on the intra-prediction mode of the current block;

predicting the current subblock based on the intra-prediction mode of the current subblock to generate prediction samples for the current subblock;

encoding the current subblock based on the prediction samples for the current subblock; and reconstructing the current subblock based on the prediction samples for the current subblock, wherein reconstructed samples of the current subblock are used as a reference sample for intra prediction of subblocks that follow the current subblock in the coding order.

\* \* \* \* \*